United States Patent
Umemura et al.

(10) Patent No.: US 12,545,595 B2
(45) Date of Patent: Feb. 10, 2026

(54) LOW-CRYSTALLINE PHOSPHOROUSCONTAINING VANADIUM SULFIDE, METHOD FOR PRODUCING, ACTIVE MATERIAL, ELECTRODE, AND LITHIUM ION SECONDARY BATTERY INCLUDING THE SAME

(71) Applicant: National Institute of Advanced Industrial Science and Technology, Tokyo (JP)

(72) Inventors: Yuki Umemura, Osaka (JP); Tomonari Takeuchi, Osaka (JP); Hikari Sakaebe, Osaka (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 876 days.

(21) Appl. No.: 17/638,591

(22) PCT Filed: Aug. 26, 2020

(86) PCT No.: PCT/JP2020/032118
§ 371 (c)(1),
(2) Date: Jul. 22, 2022

(87) PCT Pub. No.: WO2021/039820
PCT Pub. Date: Mar. 4, 2021

(65) Prior Publication Data
US 2022/0396496 A1   Dec. 15, 2022

(30) Foreign Application Priority Data
Aug. 30, 2019 (JP) ................. 2019-158922

(51) Int. Cl.
*C01G 31/00* (2006.01)
*H01M 10/0525* (2010.01)

(52) U.S. Cl.
CPC ...... *C01G 31/006* (2013.01); *H01M 10/0525* (2013.01); *C01P 2002/72* (2013.01); *C01P 2006/40* (2013.01)

(58) Field of Classification Search
CPC .. H01M 4/136; H01M 4/1397; H01M 4/5815; H01M 10/0525; C01G 31/006
(Continued)

(56) References Cited

U.S. PATENT DOCUMENTS

| | | |
|---|---|---|
| 2015/0311506 A1 | 10/2015 | Mizuno et al. |
| 2018/0006298 A1 | 1/2018 | Takeuchi et al. |
| 2019/0067684 A1* | 2/2019 | Xu ............ H01M 10/0525 |

FOREIGN PATENT DOCUMENTS

| | | | |
|---|---|---|---|
| CN | 108923031 A | * | 11/2018 |
| CN | 109950538 A | * | 6/2019 |

(Continued)

OTHER PUBLICATIONS

Umemura et al., Improvement of Cycle Capability of $VS_4$ by Addition of Phosphorus Element, Electrochemistry, 2021, 89, 273-278 (Year: 2021).*

(Continued)

*Primary Examiner* — Sean P Cullen
(74) *Attorney, Agent, or Firm* — Cesari and McKenna, LLP

(57) ABSTRACT

An electrode active material for lithium-ion secondary batteries that has a sufficiently high initial capacity, improved charge-and-discharge cycle characteristics, and improved coulombic efficiency in the mid-term charge-and-discharge cycles can be obtained by a phosphorus-containing low-crystalline vanadium sulfide comprising vanadium, phosphorus, and sulfur as constituent elements, the composition ratio of the phosphorus to the vanadium (P/V) being 0.1 to 1.0 in terms of the molar ratio, the composition ratio of the (Continued)

sulfur to the vanadium (S/V) being 4.00 to 10.00 in terms of the molar ratio.

6 Claims, 29 Drawing Sheets

(58) Field of Classification Search
USPC .................................................. 429/218.1
See application file for complete search history.

(56) References Cited

FOREIGN PATENT DOCUMENTS

| JP | 2007/273217 A | 10/2007 | | |
|---|---|---|---|---|
| JP | 2016-186952 A | 10/2016 | | |
| JP | 2018/537813 A | 12/2018 | | |
| WO | WO-2017079873 A1 * | 5/2017 | .......... | H01M 10/052 |
| WO | WO-2016/080443 A1 | 9/2017 | | |
| WO | WO-2018/181698 A1 | 10/2018 | | |

OTHER PUBLICATIONS

Xu et al "Lithium Reaction Mechanism and High Rate Capability of $VS_4$-Graphene Nanocomposite as an Anode Material for Lithium Batteries" Journal of Materials Chemistry A vol. 2, pp. 10847-10853, 2014.
European Search Report dated Aug. 30, 2023 for European Patent Application No. 20859506.6.

* cited by examiner

LOW-CRYSTALLINE PHOSPHOROUSCONTAINING VANADIUM SULFIDE, METHOD FOR PRODUCING, ACTIVE MATERIAL, ELECTRODE, AND LITHIUM ION SECONDARY BATTERY INCLUDING THE SAME

CROSS-REFERENCE TO RELATED APPLICATIONS

The present patent application is the national stage of International Patent Application No. PCT/JP2020/032118, filed on Aug. 26, 2020, which claims the benefit of priority based on Japanese Application No. 2019-158922, filed on Aug. 30, 2019. Furthermore, the entire contents and disclosures of the international patent application and the Japanese patent application are incorporated herein by reference in their entirety.

TECHNICAL FIELD

The present invention relates to a phosphorus-containing low-crystalline vanadium sulfide.

BACKGROUND ART

Since portable electronic devices, hybrid vehicles, etc., have had higher performance in recent years, the lithium-ion secondary batteries used for such devices are increasingly required to have higher capacity. However, for current lithium-ion secondary batteries, the development of higher-capacity cathodes lags behind the development of higher-capacity anodes. Even lithium nickel oxide-based materials, which are said to have a relatively high capacity, have a capacity of only about 190 to 220 mAh/g.

In contrast, sulfur, which has a theoretical capacity of as high as about 1670 mAh/g, is a promising candidate for a cathode material. However, sulfur has low electronic conductivity, as well as problematic dissolution as lithium polysulfide into an organic electrolyte during charging and discharging. Therefore, a technique for suppressing dissolution into an organic electrolyte is essential.

Metal sulfides are electronically conductive, and also have reduced dissolution into an organic electrolyte. However, metal sulfides have lower theoretical capacities than sulfur, and also have problematically low reversibility due to a great structural change resulting from Li insertion and extraction during charging and discharging. To increase the capacities of metal sulfides, increasing sulfur content is necessary. However, since the sites of crystalline metal sulfides into which Li can be inserted during discharging are defined by crystal space groups, and this determines the maximum capacity, it is difficult to exceed this maximum capacity value.

For example, as a vanadium sulfide among metal sulfides, when crystalline vanadium sulfide (III) ($V_{2.0}S_{3.0}$) sold as a reagent is used as a cathode active material, its actual measured charge capacity is only about 23 mAh/g, and its discharge capacity is only about 52 mAh/g although the theoretical capacity is as high as 811.0 mAh/g because a reaction with an organic electrolyte cannot be suppressed. Non-patent Literature 1 proposes using $VS_4$-rGO, which is a nanocomposite with graphene oxide prepared by a hydrothermal synthesis method, as an anode material for lithium-ion secondary batteries because it has high rate capability. However, this material is crystalline. Even when such a nanocomposite with another material is formed, the sites into which Li can be inserted during discharging are defined by crystal space groups, and this determines the maximum capacity. Thus, there is room for improvement in capacity.

In view of the above, the present inventors conducted extensive research and found that a specific low-crystalline vanadium sulfide allows an improvement in the actual capacity (for example, see Patent Literature 1).

CITATION LIST

Patent Literature

PTL 1: WO2018/181698

Non-Patent Literature

NPL 1: X. Xu, et al., J. Mater. Chem. A, 2. (2014) 10847-10853.

SUMMARY OF INVENTION

Technical Problem

However, according to the above-mentioned low-crystalline vanadium sulfide, although the initial capacity can be improved, the charge-and-discharge cycle characteristics are insufficient. In the low-crystalline vanadium sulfide, the coulombic efficiency in the initial charge-and-discharge cycles are excellent, but deteriorates from the 15th cycle onward, and the coulombic efficiency in the mid-term charge-and-discharge cycles (15 to 40 cycles, in particular, 20 to 35 cycles) is insufficient.

Therefore, an object of the present invention is to provide an electrode active material for lithium-ion secondary batteries that has a sufficiently high initial capacity, improved charge-and-discharge cycle characteristics, and improved coulombic efficiency in the mid-term charge-and-discharge cycles.

Solution to Problem

The present inventors conducted extensive research to achieve the above object, and found that when used as an electrode active material for lithium-ion secondary batteries, a phosphorus-containing low-crystalline vanadium sulfide having a specific composition achieves a sufficiently high initial capacity, improved charge-and-discharge cycle characteristics, and improved coulombic efficiency in the mid-term charge-and-discharge cycles. The present invention has been accomplished through further research based on the above finding. Specifically, the present invention includes the following.

Item 1. A phosphorus-containing low-crystalline vanadium sulfide comprising vanadium, phosphorus, and sulfur as constituent elements, the composition ratio of the phosphorus to the vanadium (P/V) being 0.1 to 1.0 in terms of the molar ratio, the composition ratio of the sulfur to the vanadium (S/V) being 4.00 to 10.00 in terms of the molar ratio.

Item 2. The phosphorus-containing low-crystalline vanadium sulfide according to Item 1, which has a composition represented by formula (1):

$$P_x VS_y \qquad (1)$$

wherein x is 0.1 to 1.0, and y is 4.00 to 10.00.

Item 3. The phosphorus-containing low-crystalline vanadium sulfide according to Item 1 or 2, which has a $VS_4$-type crystal structure.

Item 4. The phosphorus-containing low-crystalline vanadium sulfide according to any one of Items 1 to 3, which has peaks with local maxima at least at 15.0°, 24.3°, 32.9°, 36.2°, and 53.9° in the diffraction angle range of 2θ=10° to 80° with a tolerance of ±1.0° in an X-ray diffractogram obtained using Cu Kα radiation.

Item 5. The phosphorus-containing low-crystalline vanadium sulfide according to any one of Items 1 to 4, wherein the peak with a local maximum at 2θ=15.0° has a full width at half maximum of 1.0° to 3.0°.

Item 6. A method for producing the phosphorus-containing low-crystalline vanadium sulfide according to any one of Items 1 to 5, comprising subjecting a starting material containing a vanadium sulfide and a phosphorus-containing material as a raw material or an intermediate to mechanical milling.

Item 7. The production method according to Item 6, wherein the starting material further contains sulfur.

Item 8. An electrode active material for lithium-ion secondary batteries, comprising the phosphorus-containing low-crystalline vanadium sulfide according to any one of Items 1 to 5.

Item 9. An electrode for lithium-ion secondary batteries, comprising the electrode active material for lithium-ion secondary batteries according to Item 8.

Item 10. A lithium-ion secondary battery comprising the electrode for lithium-ion secondary batteries according to Item 9.

Advantageous Effects of Invention

The phosphorus-containing low-crystalline vanadium sulfide of the present invention is a material that achieves a sufficiently high initial capacity, improved charge-and-discharge cycle characteristics, and improved coulombic efficiency in the mid-term charge-and-discharge cycles.

DESCRIPTION OF EMBODIMENTS

Figure 1:
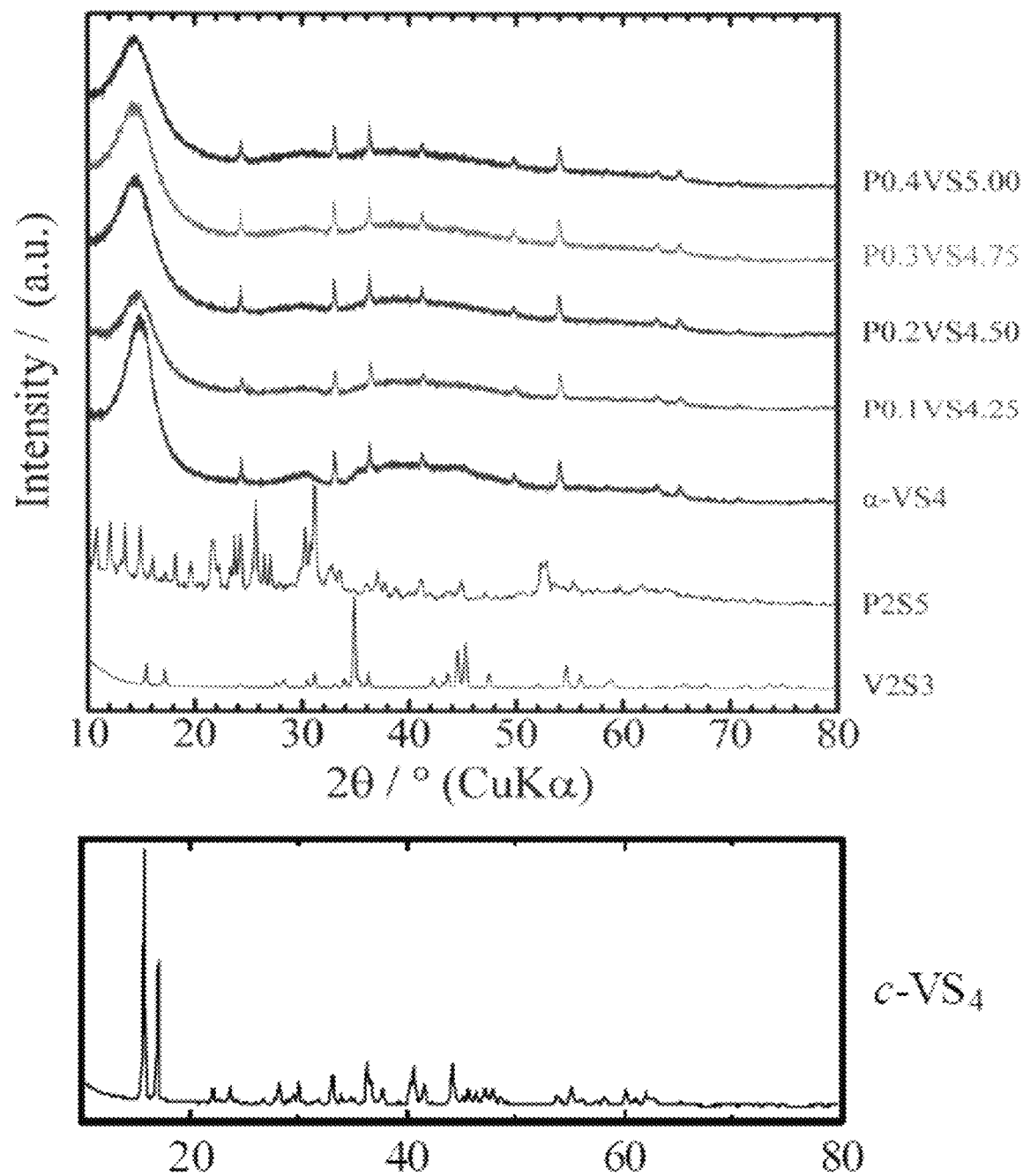
FIG. 1 shows an X-ray diffractogram of the powders obtained in Examples 1 to 4.
Figure 2:
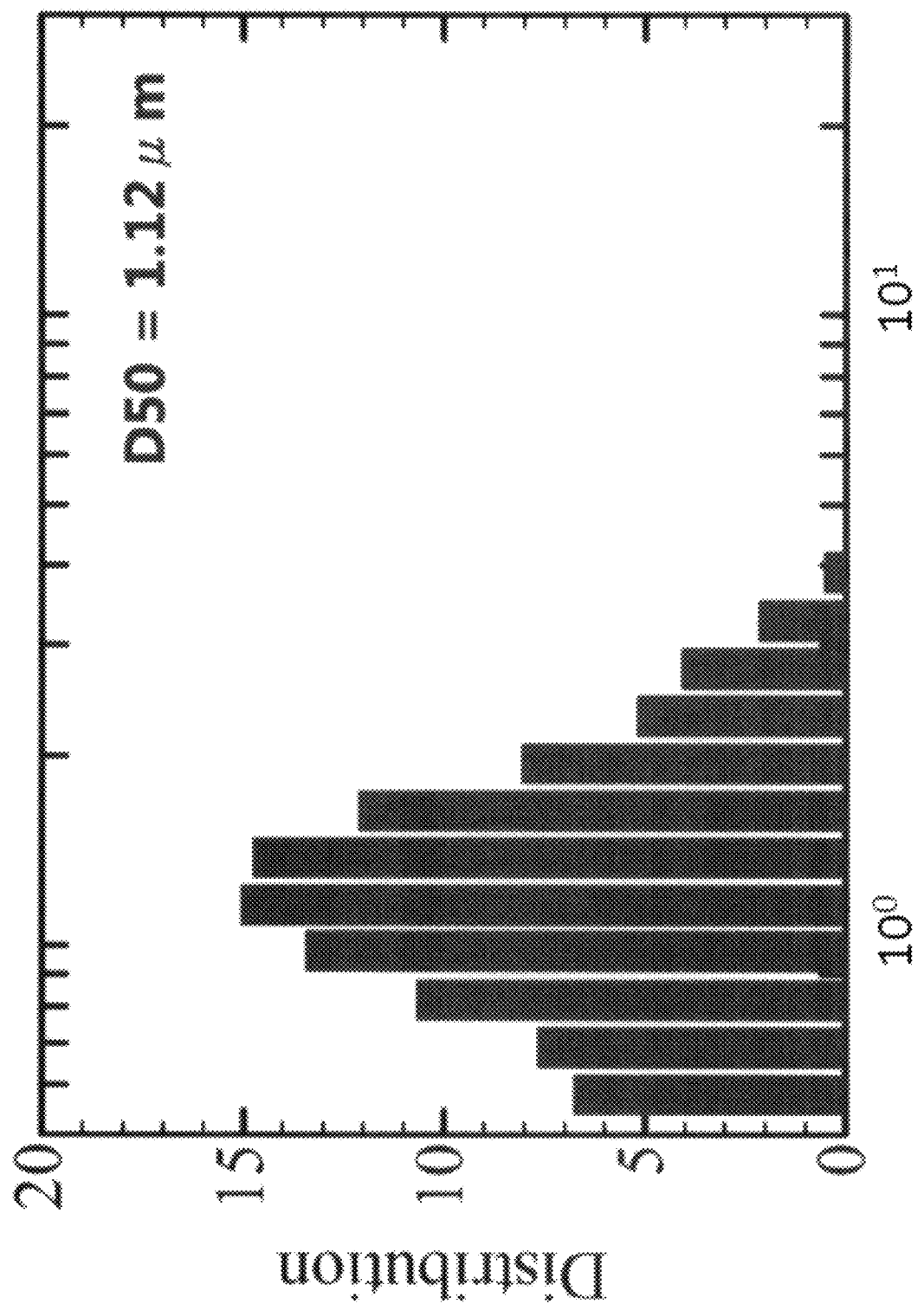
FIG. 2 shows a particle size distribution of the $VS_4$ powder obtained in Comparative Example 1.
Figure 3:
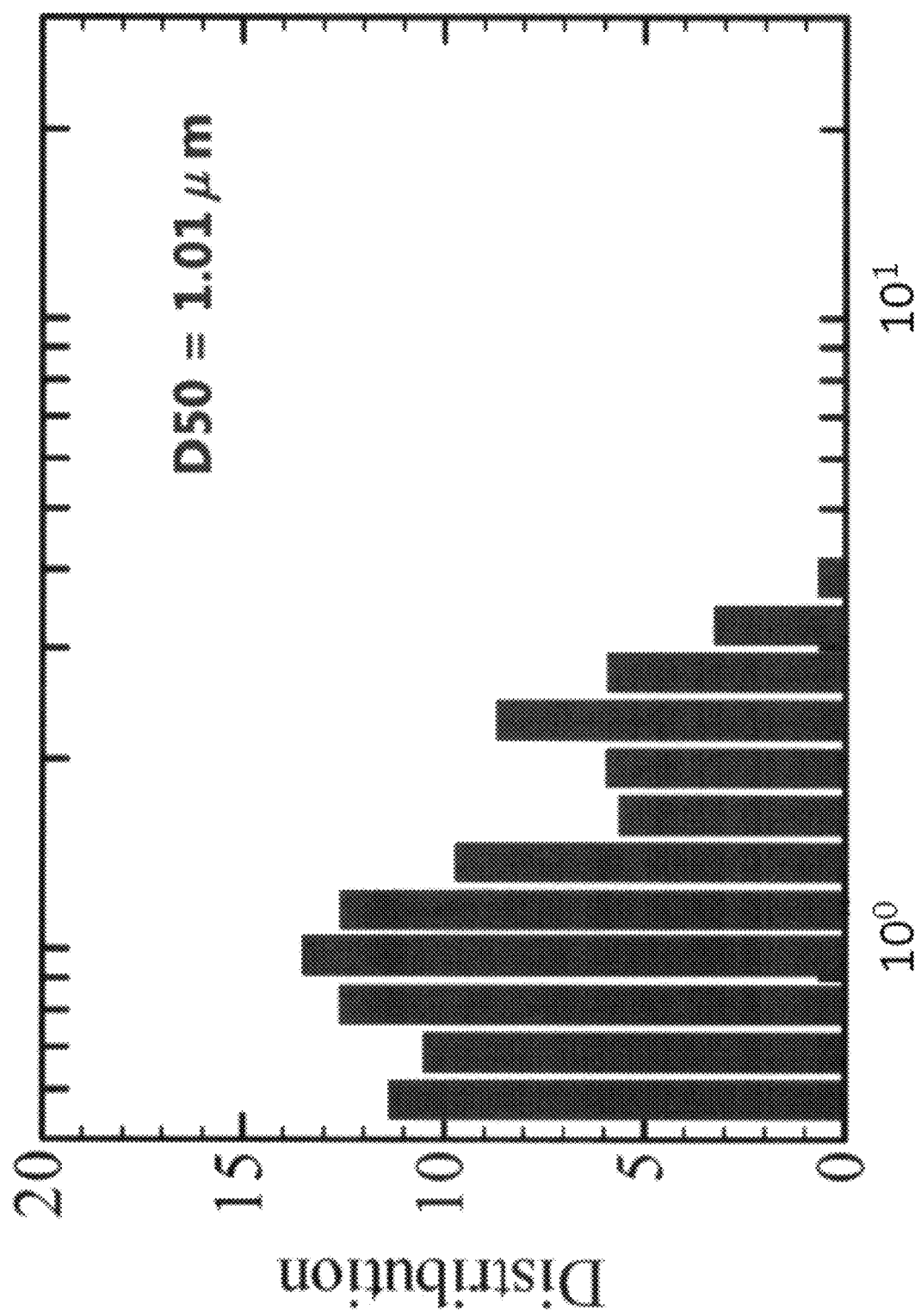
FIG. 3 shows a particle size distribution of the $P_{0.1}VS_{4.25}$ powder obtained in Example 1-1.
Figure 4:
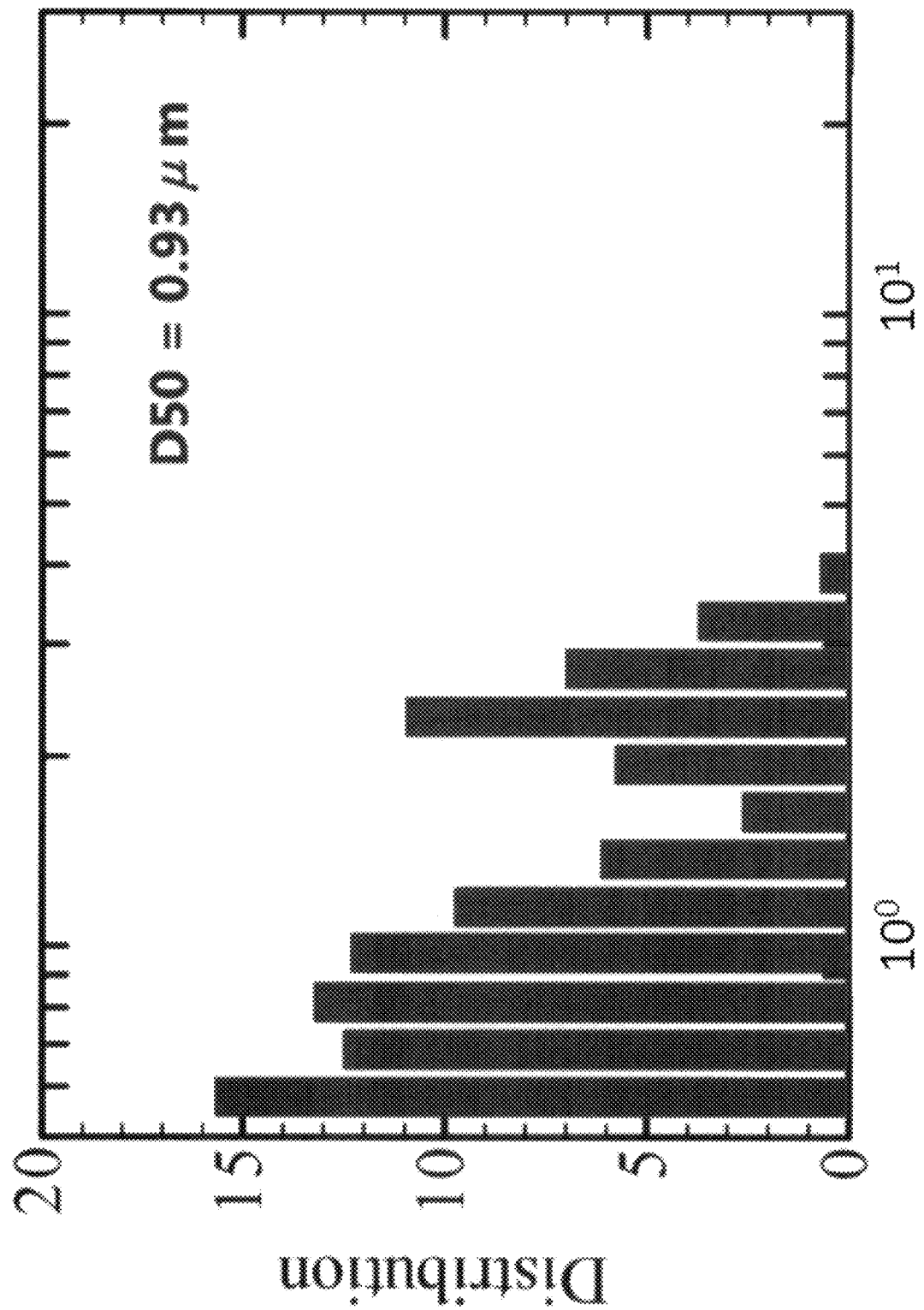
FIG. 4 shows a particle size distribution of the $P_{0.2}VS_{4.50}$ powder obtained in Example 2-1.
Figure 5:
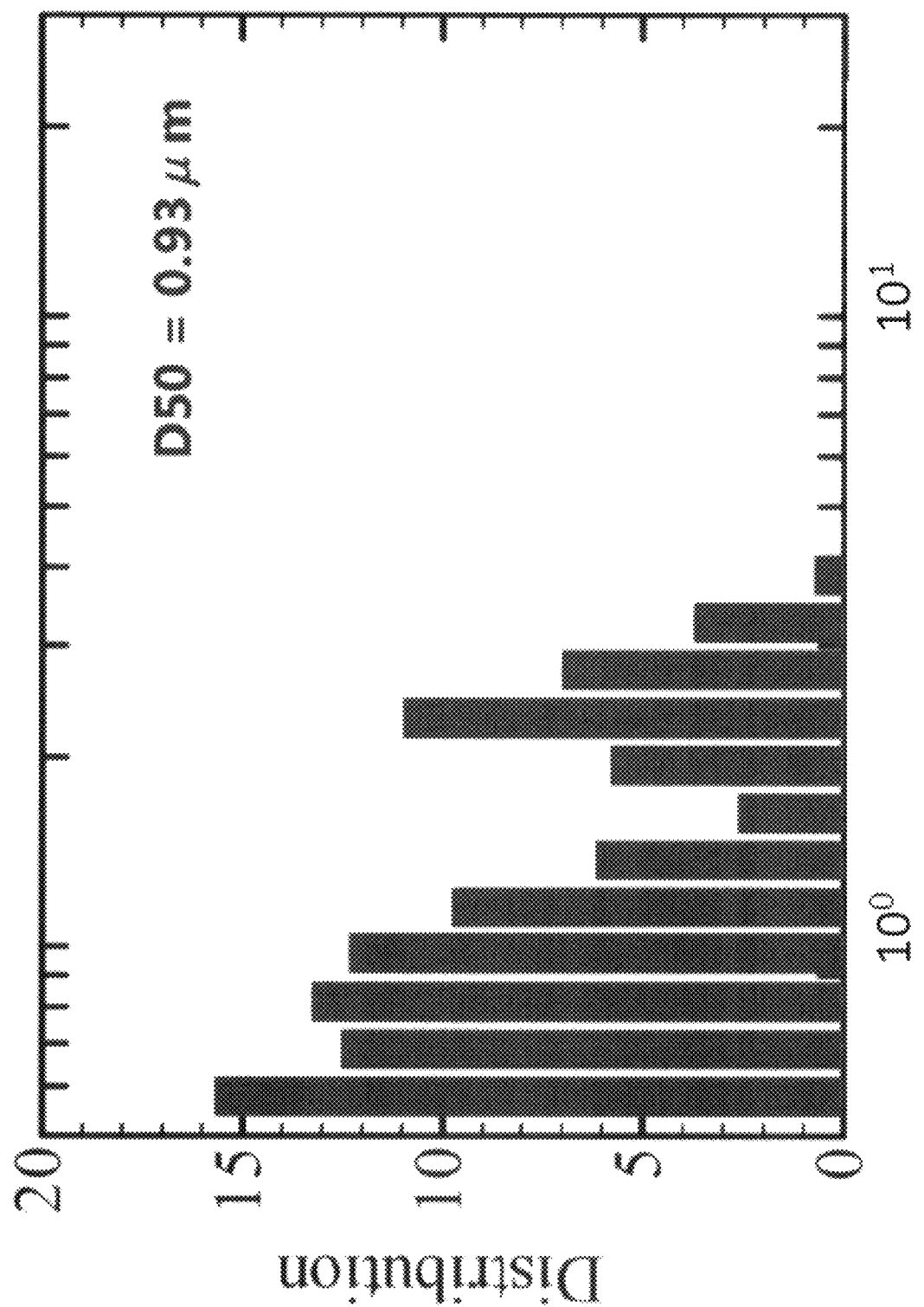
FIG. 5 shows a particle size distribution of the $P_{0.4}VS_{5.00}$ powder obtained in Example 4-1.
Figure 6:
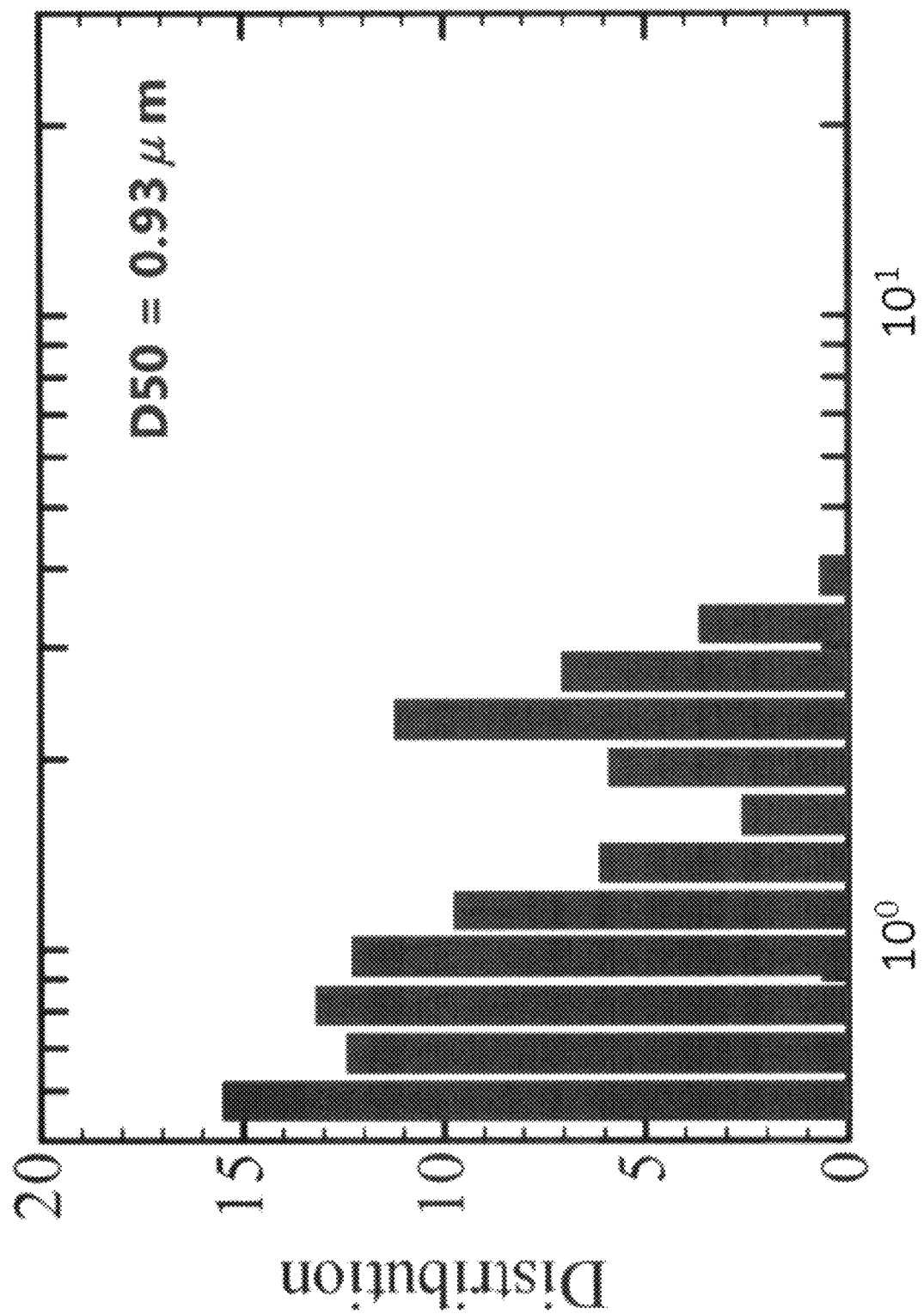
FIG. 6 shows a particle size distribution of the $P_{0.5}VS_{6.00}$ powder obtained in Example 5.
Figure 7:
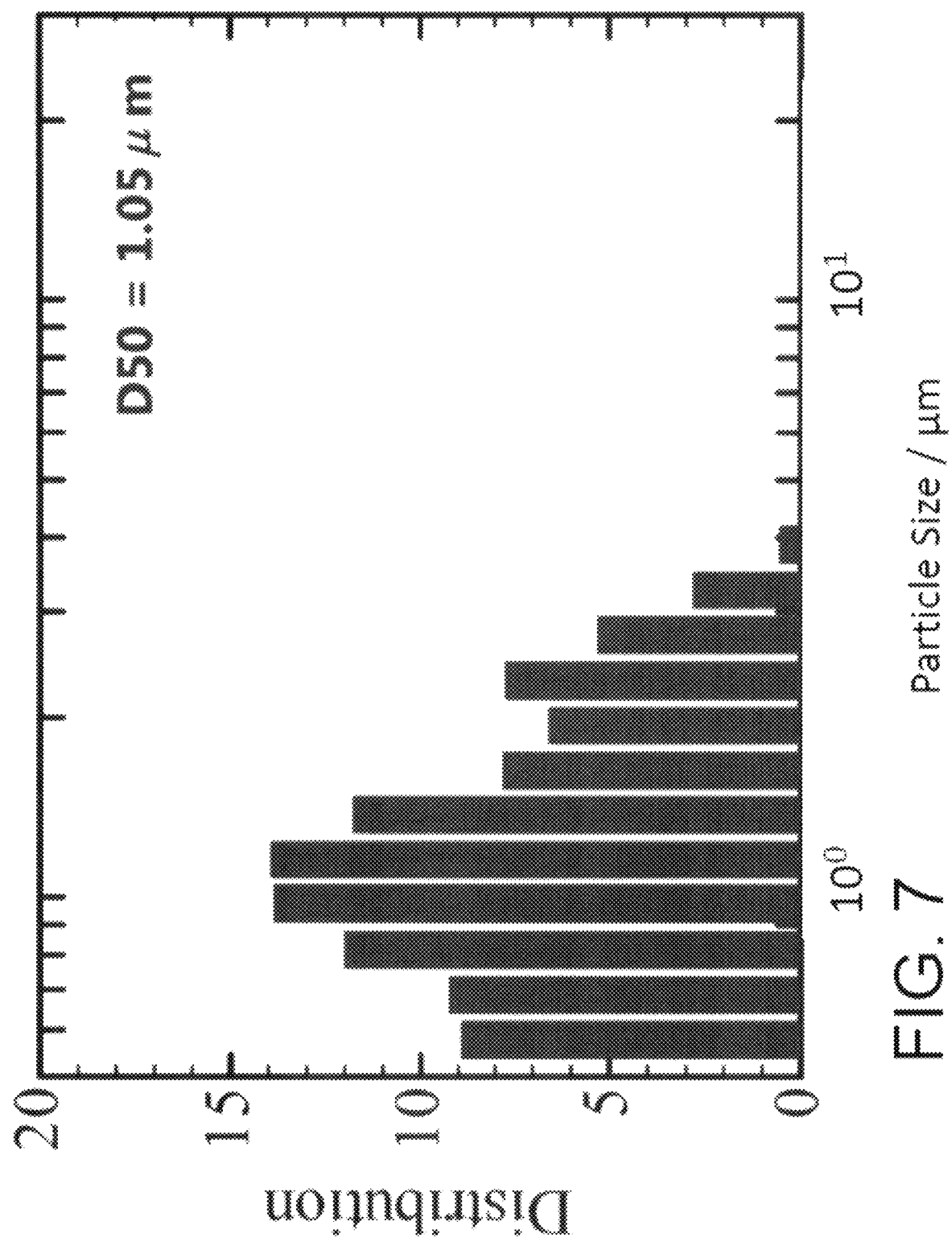
FIG. 7 shows a particle size distribution of the $PVS_{8.00}$ powder obtained in Example 6.

In the present specification, "contain" and "comprise" include all the concepts of "comprise," "consist essentially of," and "consist of."

In the present specification, the expression "A to B" means "A or more and B or less."

Further, in the present specification, the concept of "lithium-ion secondary battery" also includes lithium secondary batteries containing lithium metal as an anode active material.

1. Phosphorus-Containing Low-Crystalline Vanadium Sulfide

The phosphorus-containing low-crystalline vanadium sulfide of the present invention comprises vanadium, phosphorus, and sulfur as constituent elements, the composition ratio of the phosphorus to the vanadium (P/V) being 0.1 to 1.0 in terms of the molar ratio, the composition ratio of the sulfur to the vanadium (S/V) being 4.00 to 10.00 in terms of the molar ratio.

More specifically, the phosphorus-containing low-crystalline vanadium sulfide of the present invention preferably has a composition represented by formula (1):

$$P_xVS_y \qquad (1)$$

wherein x is 0.1 to 1.0, and y is 4.00 to 10.00.

As described above, the phosphorus-containing low-crystalline vanadium sulfide of the present invention has a high element ratio of sulfur to vanadium. Thus, the phosphorus-containing low-crystalline vanadium sulfide of the present invention has a high initial specific capacity. Further, since the phosphorus-containing low-crystalline vanadium sulfide of the present invention comprises phosphorus, the charge-and-discharge cycle characteristics and the coulombic efficiency in the mid-term charge-and-discharge cycles can be improved.

In the present invention, by adjusting the phosphorus content (x value) to an appropriate range, the charge-and-discharge cycle characteristics and the coulombic efficiency in the mid-term charge-and-discharge cycles can be particularly improved. Accordingly, x is preferably 0.1 to 1.0, more preferably 0.2 to 0.5, and even more preferably 0.3 to 0.4.

In the present invention, the higher the sulfur content (the larger y is), the more likely it is the specific capacity will be higher; and the lower the sulfur content (the smaller y is), the less likely it is that the phosphorus-containing low-crystalline vanadium sulfide will contain elemental sulfur and the more likely it is that the charge-and-discharge cycle characteristics will be higher. In order to balance these, y is preferably 4.00 to 10.00, more preferably 4.20 to 9.00, and particularly preferably 5.00 to 8.00.

The relationship between the x value and the y value is not particularly limited. In terms of, for example, specific capacity, charge-and-discharge cycle characteristics, coulombic efficiency in the mid-term charge-and-discharge cycles, it is preferable that y=2.5x+4.

The phosphorus-containing low-crystalline vanadium sulfide of the present invention preferably has a crystal structure similar to that of crystalline vanadium tetrasulfide (IV) ($VS_4$) (which hereinafter may be referred to as "$VS_4$-type crystal structure").

More specifically, the phosphorus-containing low-crystalline vanadium sulfide of the present invention preferably has peaks with local maxima at least at 15.0°, 24.3°, 32.9°, 36.2°, and 53.9° in the diffraction angle range of 2θ=10° to 80° with a tolerance of ±1.0° (preferably a tolerance of ±0.5°) in an X-ray diffractogram obtained using Cu Kα radiation. That is, the phosphorus-containing low-crystalline vanadium sulfide of the present invention preferably has peaks with local maxima in the ranges of 14.0° to 16.0°, 23.3° to 25.3°, 31.9° to 33.9°, 35.2° to 37.2°, and 52.9° to 54.9° (preferably the ranges of 14.5° to 15.5°, 23.8° to 24.8°, 32.4° to 33.4°, 35.7° to 36.7°, and 53.4° to 54.4°).

In the present invention, the X-ray diffractogram is obtained by a powder X-ray diffraction method. For example, measurement is performed under the following measurement conditions:

Measuring device: D8 ADVANCE (Bruker AXS)
X-ray source: Cu Kα 40 kV/40 mA
Measurement conditions: 2θ=10° to 80°, 0.1° step, scan rate: 0.01°/sec.

In the phosphorus-containing low-crystalline vanadium sulfide of the present invention, a bond is formed between phosphorus and sulfur atoms. Although the phosphorus-containing low-crystalline vanadium sulfide has a high sulfur ratio in the average composition, little sulfur is present in the form of elemental sulfur, and sulfur is bound to vanadium and phosphorus to form a low-crystalline sulfide; therefore, formation of by-products is suppressed, and charging and discharging proceed reversibly, compared with low-crystalline vanadium sulfides containing no phosphorus. Compared with such low-crystalline vanadium sulfides, which have only V—S bonds, the phosphorus-containing low-crystalline vanadium sulfide of the present invention have V—S bonds and P—S bonds. The increase in the number of bonds to the sulfur atom is considered to further suppress dissolution of the sulfur atom caused by charging and discharging, and formation of by-products derived from the sulfur atom; and to improve charge-and-discharge cycle characteristics and coulombic efficiency in the mid-term charge-and-discharge cycles.

The phrase "low crystalline" in the present invention is explained below. In the phosphorus-containing low-crystalline vanadium sulfide of the present invention, the peak with a local maximum at 2θ=15.0° (specifically, 14.0° to 16.0°, in particular, 14.5° to) 15.5° with a tolerance of ±1.0° (preferably a tolerance of ±0.5°) preferably has a full width at half maximum of 1.0° to 3.0° (in particular, 2.0° to 2.8°). The full width at half maximum of the peak with a local maximum at 2θ=15.0° with a tolerance of ±1.0° (preferably a tolerance of ±0.5°) in the phosphorus-containing low-crystalline vanadium sulfide of the present invention is preferably larger than that of crystalline vanadium tetrasulfide (IV) ($VS_4$) or the like. Thus, the low crystallinity in the present invention increases the number of sites where Li can exist stably, which improves the initial specific capacity, charge-and-discharge cycle characteristics, and coulombic efficiency in the mid-term charge-and-discharge cycles.

When a material containing a large amount of elemental sulfur or the like is used as an electrode active material (a cathode active material or the like), a carbonate-based solvent reacts with elemental sulfur. When an ether-based solvent is used, a large amount of a sulfur component is dissolved. These lead to performance degradation, narrowing the range of choice for solvents. In contrast, the phosphorus-containing low-crystalline vanadium sulfide of the present invention contains almost no elemental sulfur or the like; therefore, when used as an electrode active material (a cathode active material or the like), the phosphorus-containing low-crystalline vanadium sulfide of the present invention does not cause the above problems even if carbonate-based solvents or ether-based solvents are used, thus enhancing the selectivity of solvents for electrolytes.

More specifically, the most intense peak of sulfur ($S_8$) has a local maximum at 2θ=23.0° with a tolerance of ±1.0° (preferably a tolerance of ±0.5°). It is thus preferable that the phosphorus-containing low-crystalline vanadium sulfide does not have a peak with a local maximum at 2θ=23.0°, which is a peak characteristic of elemental sulfur, with a tolerance of ±1.0° (preferably a tolerance of ±0.5°) in an X-ray diffractogram obtained using Cu Kα radiation. This allows the phosphorus-containing low-crystalline vanadium sulfide of the present invention to be a material that contains almost no elemental sulfur, further reduces the concern of causing a reaction with an electrolyte, and further improves the initial specific capacity, charge-and-discharge cycle characteristics, and coulombic efficiency in the mid-term charge-and-discharge cycles.

It is preferable that the low-crystalline vanadium sulfide of the present invention also does not have peaks with local maxima at positions of 2θ=25.8° and 27.8°, which are peaks characteristic of elemental sulfur, with a tolerance of ±1.0° (preferably a tolerance of ±0.5°). This allows the phosphorus-containing low-crystalline vanadium sulfide of the present invention to be a material that contains almost no elemental sulfur, further reduces the concern of causing a reaction with an electrolyte, and further improves the initial specific capacity, charge-and-discharge cycle characteristics, and coulombic efficiency in the mid-term charge-and-discharge cycles.

It is preferable that the low-crystalline vanadium sulfide of the present invention also does not have a peak with a local maximum at a position of 2θ=45.0°, which is a peak characteristic of low-crystalline vanadium sulfides containing no phosphorus, with a tolerance of ±1.0° (preferably a tolerance of ±0.5°). This makes it possible to form bonds between phosphorus and sulfur and between vanadium and sulfur in the phosphorus-containing low-crystalline vanadium sulfide of the present invention, further reduce the concern of causing a reaction with an electrolyte, and further improve charge-and-discharge cycle characteristics and coulombic efficiency in the mid-term charge-and-discharge cycles.

Moreover, the low-crystalline vanadium sulfide of the present invention preferably has an average particle size D50 of 0.90 to 1.20 μm (in particular, 0.92 to 1.15 μm). In particular, in the low-crystalline vanadium sulfide of the present invention, it is preferable that the X-ray diffraction pattern is not broadened due to the particle size, but that the X-ray diffraction pattern is broadened due to a decrease in crystallinity (low crystallinity).

As long as the performance of the phosphorus-containing low-crystalline vanadium sulfide of the present invention is not impaired, other impurities may be contained. Examples of such impurities include phosphorus sulfides (e.g., $P_2S_5$), vanadium sulfides (e.g., $V_2S_3$ and $VS_4$), and like materials that can be used as raw materials; phosphorus, vanadium, and like materials that may be introduced into raw materials; oxygen, etc., that may be introduced into raw materials or during the production process.

The amount of these impurities is preferably in the range that does not impair the performance of the phosphorus-containing low-crystalline vanadium sulfide of the present invention. In general, the amount of impurities is preferably 2 mass % or less (0 to 2 mass %), and more preferably 1.5 mass % or less (0 to 1.5 mass %), based on the total amount of the phosphorus-containing low-crystalline vanadium sulfide of the present invention taken as 100 mass %. As an impurity, the elemental sulfur content is preferably as low as possible, as mentioned above.

As described above, the phosphorus-containing low-crystalline vanadium sulfide of the present invention achieves a sufficiently high initial capacity, improved charge-and-discharge cycle characteristics, and improved coulombic efficiency in the mid-term charge-and-discharge cycles. Therefore, the phosphorus-containing low-crystalline vanadium sulfide of the present invention is useful as an electrode active material for lithium-ion secondary batteries (in particular, a cathode active material for lithium-ion secondary batteries).

2. Method for Producing Phosphorus-Containing Low-Crystalline Vanadium Sulfide

The phosphorus-containing low-crystalline vanadium sulfide of the present invention can be obtained by a production method comprising subjecting a starting material containing a vanadium sulfide and a phosphorus-containing material as a raw material or an intermediate to mechanical milling. The starting material may also contain sulfur depending on the desired composition.

Mechanical milling is a method of milling and mixing raw materials while imparting mechanical energy. According to this method, a mechanical impact and friction are given to raw materials to mill and mix the materials, whereby a vanadium sulfide, a phosphorus-containing material, and optionally sulfur are vigorously contacted with each other and divided into fine particles to allow the reaction of the raw materials to proceed. That is, in this case, mixing, pulverization, and the reaction occur simultaneously. This enables the reaction of the raw materials to reliably proceed without heating the raw materials at a high temperature. Mechanical milling may provide a metastable crystal structure that cannot be obtained by ordinary heat treatment.

Specific examples of mechanical milling include mixing and pulverization using a mechanical pulverizer, such as ball mills, bead mills, rod mills, vibration mills, disc mills, hammer mills, and jet mills.

These raw materials or intermediates may all be mixed together simultaneously and subjected to mechanical milling.

Alternatively, after a portion of the raw materials or intermediates are first subjected to mechanical milling, the remaining materials may be added and subjected to mechanical milling.

Preferable examples of specific vanadium sulfides that can be used as raw materials include crystalline vanadium sulfide (III) ($V_2S_3$), crystalline vanadium sulfide (VIII) ($VS_4$), and the like. The vanadium sulfide is not particularly limited, and any commercially available vanadium sulfide can be used. It is particularly preferable to use a high-purity vanadium sulfide. Since a vanadium sulfide is mixed and pulverized by mechanical milling, the particle size of the vanadium sulfide to be used is also not limited. A commercially available vanadium sulfide powder can generally be used.

In addition to elemental phosphorus (P), phosphorous sulfides such as crystalline phosphorus sulfide (V) ($P_2S_5$) can be used as phosphorus-containing materials. The phosphorus-containing material is not particularly limited, and any commercially available phosphorus-containing material can be used. It is particularly preferable to use a high-purity phosphorus-containing material. Since a phosphorus-containing material is mixed and pulverized by mechanical milling, the particle size of the phosphorus-containing material to be used is also not limited. A commercially available phosphorus-containing material powder can generally be used.

As sulfur, it is possible to use elemental sulfur ($S_8$) in an amount necessary to form a sulfide having a composition used as an intermediate so that the composition of the sulfide finally obtained is achieved. The sulfur used as a raw material is not particularly limited, and any sulfur can be used. It is particularly preferable to use high-purity sulfur. Since sulfur is mixed and pulverized by mechanical milling, the particle size of the sulfur to be used is also not limited. A commercially available sulfur powder can generally be used.

When multiple-step (in particular, two-step) mechanical milling is used as described above, the intermediate may be, for example, a low-crystalline vanadium sulfide having a desired composition (e.g., low-crystalline $VS_4$) or the like.

Since the ratio of the raw materials fed almost directly becomes the same as the ratio of the elements of the product, the mixing ratio of the raw materials may be adjusted to the same ratio as the element ratio of vanadium, phosphorus, and sulfur in the desired phosphorus-containing low-crystalline vanadium sulfide.

The temperature during the mechanical milling is not particularly limited. In order to suppress the volatilization of sulfur and suppress the formation of the crystalline phases previously reported, the temperature during the mechanical milling is preferably 300° C. or less, and more preferably -10 to 200° C.

The mechanical milling time is not particularly limited. The mechanical milling can be performed for any length of time until the desired phosphorus-containing low-crystalline vanadium sulfide is precipitated.

For example, the mechanical milling can be performed for 0.1 to 100 hours (in particular, 10 to 80 hours) while applying energy in an amount of 0.1 to 100 kWh/kg of the raw material mixture. The mechanical milling may be performed a plurality of times with pauses in between, if necessary.

When the mechanical milling is repeated a plurality of times, the above conditions can be used for each mechanical milling step.

The mechanical milling can produce the desired phosphorus-containing low-crystalline vanadium sulfide in the form of a fine powder.

3. Use of Phosphorus-Containing Low-Crystalline Vanadium Sulfide

As described above, the phosphorus-containing low-crystalline vanadium sulfide of the present invention achieves a sufficiently high initial capacity, improved charge-and-discharge cycle characteristics, and improved coulombic efficiency in the mid-term charge-and-discharge cycles. Thus, the phosphorus-containing low-crystalline vanadium sulfide of the present invention is particularly useful as an electrode active material for lithium-ion secondary batteries. Lithium-ion secondary batteries in which the phosphorus-containing low-crystalline vanadium sulfide of the present invention can be effectively used as an electrode active material (in particular, a cathode active material) may be non-aqueous electrolyte lithium-ion secondary batteries comprising a non-aqueous electrolyte as an electrolyte, or all-solid-state lithium-ion secondary batteries comprising a lithium-ion-conductive solid electrolyte. The phosphorus-containing low-crystalline vanadium sulfide of the present invention can reduce the concern of causing a reaction with an electrolyte and thus is particularly useful when used in non-aqueous electrolyte lithium-ion secondary batteries.

The non-aqueous electrolyte lithium-ion secondary batteries and all-solid-state lithium-ion secondary batteries may have the same structures as known lithium-ion secondary batteries, except that the phosphorus-containing low-crystalline vanadium sulfide of the present invention is used as an electrode active material (in particular, a cathode active material).

For example, the non-aqueous electrolyte lithium-ion secondary batteries may have the same basic structures as known non-aqueous electrolyte lithium-ion secondary batteries, except that the phosphorus-containing low-crystalline vanadium sulfide of the present invention is used as an electrode active material (in particular, a cathode active material).

When the phosphorus-containing low-crystalline vanadium sulfide of the present invention is used as a cathode active material, the cathode may have the same structure as a known cathode, except that the phosphorus-containing low-crystalline vanadium sulfide of the present invention is used as a cathode active material. For example, a cathode composite containing the phosphorus-containing low-crystalline vanadium sulfide of the present invention and, if necessary, containing a conductive agent and a binder may be supported on a cathode current collector, such as Al, Ni, stainless steel, or carbon cloth. Examples of conductive agents include carbon materials such as graphite, coke, carbon black (e.g., Ketjenblack®), and acicular carbon. Examples of binders include polyvinylidene fluoride (PVDF), polytetrafluoroethylene (PTFE), polyimide (PI), polyamide, polyamideimide, polyacryl, styrene-butadiene rubber (SBR), styrene-ethylene-butylene-styrene copolymers (SEBS), carboxymethyl cellulose (CMC), and the like. These materials may be used singly or in a combination of two or more. When the phosphorus-containing low-crystalline vanadium sulfide of the present invention is not used as a cathode active material, known cathode active materials such as lithium cobalt oxide ($LiCoO_2$), lithium nickel oxide ($LiNiO_2$), lithium manganese oxide ($LiMn_2O_4$), lithium iron phosphate ($LiFePO_4$), vanadium oxide-based materials, and sulfur-based materials can be used as cathode active materials.

When the phosphorus-containing low-crystalline vanadium sulfide of the present invention is used as an anode active material, the anode may have the same structure as a known anode, except that the phosphorus-containing low-crystalline vanadium sulfide of the present invention is used as an anode active material. For example, an anode composite containing the phosphorus-containing low-crystalline vanadium sulfide of the present invention and, if necessary, containing a conductive agent and a binder may be supported on an anode current collector, such as Al, Ni, stainless steel, or carbon cloth. Examples of conductive agents include carbon materials such as graphite, coke, carbon black, and acicular carbon. Examples of binders include polyvinylidene fluoride (PVDF), polytetrafluoroethylene (PTFE), polyimide (PI), polyamide, polyamideimide, polyacryl, styrene-butadiene rubber (SBR), styrene-ethylene-butylene-styrene copolymers (SEBS), carboxymethyl cellulose (CMC), and the like. These materials may be used singly or in a combination of two or more. When the phosphorus-containing low-crystalline vanadium sulfide of the present invention is not used as an anode active material, known anode active materials such as metallic lithium, carbon-based materials (e.g., activated carbon and graphite), silicon, silicon oxide, Si—SiO-based materials, and lithium titanium oxide can be used as anode active materials.

Examples of solvents for non-aqueous electrolytes include solvents known as solvents for non-aqueous lithium-ion secondary batteries, such as carbonates, ethers, nitriles, and sulfur-containing compounds. In particular, when elemental sulfur is used as a cathode active material, neither carbonates nor ethers can be used as a solvent. This is because a carbonate, if used as a solvent, reacts with elemental sulfur; whereas an ether, if used as a solvent, causes dissolution of a large amount of a sulfur component in an electrolyte, thus incurring performance degradation. In contrast, the phosphorus-containing low-crystalline vanadium sulfide of the present invention, when used as an electrode active material (in particular, a cathode active material), can solve these problems and make any of the solvents applicable, thus enhancing the selectivity of solvent used in the electrolyte.

As a separator, for example, a material that is made of a polyolefin resin, such as polyethylene or polypropylene, fluororesin, nylon, aromatic aramid, inorganic glass, or like materials and that is in the form of a porous membrane, a nonwoven fabric, a woven fabric, or the like can be used.

The all-solid-state lithium-ion secondary batteries may also have the same structures as known all-solid-state lithium-ion secondary batteries, except that the phosphorus-containing low-crystalline vanadium sulfide of the present invention is used as an electrode active material (in particular, a cathode active material). In this case, the cathode, anode, and separator may be those mentioned above.

In this case, examples of usable electrolytes include polymer solid electrolytes, such as polyethylene oxide polymer compounds, and polymer compounds comprising at least one member selected from the group consisting of polyorganosiloxane chains and polyoxyalkylene chains; sulfide solid electrolytes; oxide solid electrolytes; and the like.

The non-aqueous electrolyte lithium-ion secondary batteries and all-solid-state lithium-ion secondary batteries may also be of any shape, such as cylindrical or square.

EXAMPLES

The present invention is described below in more detail with reference to Examples, but is not limited to the Examples below.

The crystalline $VS_4$ (c-$VS_4$) used as a raw material in the following Examples was obtained by vacuum-sealing commercially available vanadium sulfide (III) ($V_2S_3$; produced by Kojundo Chemical Laboratory Co., Ltd.) and commercially available sulfur (produced by Fujifilm Wako Pure Chemical Corporation) in a tube and performing firing at 400° C. for 5 hours.

Comparative Example 1: Synthesis of $VS_4$ Powder

Commercially available vanadium sulfide (III) ($V_2S_3$; produced by Kojundo Chemical Laboratory Co., Ltd.) and commercially available sulfur (produced by Fujifilm Wako Pure Chemical Corporation) were weighed in an argon gas atmosphere in a glove box (dew point: −80° C.) so that the molar ratio was 1:6, and sealed in a glass tube under vacuum. The sample vacuum-sealed in the tube was fired at 400° C. for 5 hours in a tubular furnace. The fired sample was fired at 200° C. for 8 hours under vacuum to remove excess sulfur, thereby synthesizing crystalline vanadium sulfide $VS_4$ (c-$VS_4$).

Next, the obtained crystalline $VS_4$ (c-$VS_4$) was subjected to mechanical milling (ball diameter: 4 mm; rotation speed: 270 rpm) with a ball mill apparatus (PL-7 produced by Fritsch) for 40 hours in an argon gas atmosphere in a glove box (dew point: −80° C.) to synthesize low-crystalline vanadium sulfide $VS_4$ (a-$VS_4$).

Example 1: Synthesis of $P_{0.1}VS_{4.25}$ Powder

Example 1-1: Milling for 15 Hours

Crystalline $VS_4$ (c-$VS_4$) and phosphorus sulfide (V) ($P_2S_5$; produced by Aldrich) were weighed in an argon gas atmosphere in a glove box (dew point: −80° C.) so that the molar ratio was 1:0.05, and subjected to mechanical milling (ball diameter: 4 mm; rotation speed: 270 rpm) with a ball mill apparatus (PL-7 produced by Fritsch) for 15 hours to synthesize phosphorus-containing low-crystalline vanadium sulfide $P_{0.1}VS_{4.25}$ (a-$P_{0.1}VS_{4.25}$).

Example 1-2: Milling for 30 Hours

Phosphorus-containing low-crystalline vanadium sulfide $P_{0.1}VS_{4.25}$ (a-$P_{0.1}VS_{4.25}$) was synthesized in the same manner as in Example 1-1, except that the mechanical milling was performed for 30 hours.

Example 1-3: Milling for 45 Hours

Phosphorus-containing low-crystalline vanadium sulfide $P_{0.1}VS_{4.25}$ (a-$P_{0.1}VS_{4.25}$) was synthesized in the same manner as in Example 1-1, except that the mechanical milling was performed for 45 hours.

Example 1-4: Milling for 60 Hours

Phosphorus-containing low-crystalline vanadium sulfide $P_{0.1}VS_{4.25}$ (a-$P_{0.1}VS_{4.25}$) was synthesized in the same manner as in Example 1-1, except that the mechanical milling was performed for 60 hours.

Example 2: Synthesis of $P_{0.2}VS_{4.50}$ Powder

Example 2-1: Milling for 15 Hours

Crystalline $VS_4$ (c-$VS_4$) and phosphorus sulfide (V) ($P_2S_5$; produced by Aldrich) were weighed in an argon gas atmosphere in a glove box (dew point: −80° C.) so that the molar ratio was 1:0.1, and subjected to mechanical milling (ball diameter: 4 mm; rotation speed: 270 rpm) with a ball mill apparatus (PL-7 produced by Fritsch) for 15 hours to synthesize phosphorus-containing low-crystalline vanadium sulfide $P_{0.2}VS_{4.50}$ (a-$P_{0.2}VS_{4.50}$).

Example 2-2: Milling for 30 Hours

Phosphorus-containing low-crystalline vanadium sulfide $P_{0.2}VS_{4.5}$ (a-$P_{0.2}VS_{4.5}$) was synthesized in the same manner as in Example 2-1, except that the mechanical milling was performed for 30 hours.

Example 2-3: Milling for 45 Hours

Phosphorus-containing low-crystalline vanadium sulfide $P_{0.2}VS_{4.5}$ (a-$P_{0.2}VS_{4.5}$) was synthesized in the same manner as in Example 2-1, except that the mechanical milling was performed for 45 hours.

Example 2-4: Milling for 60 Hours

Phosphorus-containing low-crystalline vanadium sulfide $P_{0.2}VS_{4.5}$ (a-$P_{0.2}VS_{4.5}$) was synthesized in the same manner as in Example 2-1, except that the mechanical milling was performed for 60 hours.

Example 3: Synthesis of $P_{0.3}VS_{4.75}$ Powder

Example 3-1: Milling for 15 Hours

Crystalline $VS_4$ (c-$VS_4$) and phosphorus sulfide (V) ($P_2S_5$; produced by Aldrich) were weighed in an argon gas atmosphere in a glove box (dew point: −80° C.) so that the molar ratio was 1:0.15, and subjected to mechanical milling (ball diameter: 4 mm; rotation speed: 270 rpm) with a ball mill apparatus (PL-7 produced by Fritsch) for 15 hours to synthesize phosphorus-containing low-crystalline vanadium sulfide $P_{0.3}VS_{4.75}$ (a-$P_{0.3}VS_{4.75}$).

Example 3-2: Milling for 30 Hours

Phosphorous-containing low-crystalline vanadium sulfate $P_{0.3}VS_{4.75}$ (a-$P_{0.3}VS_{4.75}$) was synthesized in the same manner as in Example 3-1, except that the mechanical milling was performed for 30 hours.

Example 3-3: Milling for 45 Hours

Phosphorus-containing low-crystalline vanadium sulfide $P_{0.3}VS_{4.75}$ (a-$P_{0.3}VS_{4.75}$) was synthesized in the same manner as in Example 3-1, except that the mechanical milling was performed for 45 hours.

Example 3-4: Milling for 60 Hours

Phosphorus-containing low-crystalline vanadium sulfide $P_{0.3}VS_{4.75}$ (a-$P_{0.3}VS_{4.75}$) was synthesized in the same manner as in Example 3-1, except that the mechanical milling was performed for 60 hours.

Example 4: Synthesis of $P_{0.4}VS_{5.00}$ Powder

Example 4-1: Milling for 15 Hours

Crystalline $VS_4$ (c-$VS_4$) and phosphorus sulfide (V) ($P_2S_5$; produced by Aldrich) were weighed in an argon gas atmosphere in a glove box (dew point: −80° C.) so that the molar ratio was 1:0.2, and subjected to mechanical milling (ball diameter: 4 mm; rotation speed: 270 rpm) with a ball mill apparatus (PL-7 produced by Fritsch) for 15 hours to synthesize phosphorus-containing low-crystalline vanadium sulfide $P_{0.4}VS_{5.00}$ (a-$P_{0.4}VS_{5.00}$).

Example 4-2: Milling for 30 Hours

Phosphorus-containing low-crystalline vanadium sulfide $P_{0.4}VS_{5.00}$ (a-$P_{0.4}VS_{5.00}$) was synthesized in the same manner as in Example 4-1, except that the mechanical milling was performed for 30 hours.

Example 4-3: Milling for 45 Hours

Phosphorus-containing low-crystalline vanadium sulfide $P_{0.4}VS_{5.00}$ (a-$P_{0.4}VS_{5.00}$) was synthesized in the same manner as in Example 4-1, except that the mechanical milling was performed for 45 hours.

Example 4-4: Milling for 60 Hours

Phosphorous-containing low-crystalline vanadium sulfate $P_{0.4}VS_{5.00}$ (a-$P_{0.4}VS_{5.00}$) was synthesized in the same manner as in Example 4-1, except that the mechanical milling was performed for 60 hours.

Example 5: Synthesis of $P_{0.5}VS_{6.00}$ Powder

Crystalline $VS_4$ (c-$VS_4$), phosphorus sulfide (V) ($P_2S_5$; produced by Aldrich), and sulfur (produced by Fujifilm Wako Pure Chemical Corporation) were weighed in an argon gas atmosphere in a glove box (dew point: −80° C.) so that the molar ratio was 1:0.25:0.75, and subjected to mechanical milling (ball diameter: 4 mm; rotation speed: 270 rpm) with a ball mill apparatus (PL-7 produced by Fritsch) for 15 hours to synthesize phosphorus-containing low-crystalline vanadium sulfide $P_{0.5}VS_{6.00}$ (a-$P_{0.5}VS_{6.00}$).

Example 6: Synthesis of $PVS_{8.00}$ Powder

Crystalline $VS_4$ (c-$VS_4$), phosphorus sulfide (V) ($P_2S_5$; produced by Aldrich), and sulfur (produced by Fujifilm Wako Pure Chemical Corporation) were weighed in an argon gas atmosphere in a glove box (dew point: −80° C.) so that the molar ratio was 1:0.5:1.5, and subjected to mechanical milling (ball diameter: 4 mm; rotation speed: 270 rpm) with a ball mill apparatus (PL-7 produced by Fritsch) for 15 hours to synthesize phosphorus-containing low-crystalline vanadium sulfide $PVS_{8.00}$ (a-$PVS_{8.00}$).

Example 7: Synthesis of $P_{0.2}VS_{4.0}$ Powder

Example 7-1: Milling for 30 Hours

Crystalline $VS_4$ (c-$VS_4$) and elemental phosphorus (P; produced by Fujifilm Wako Pure Chemical Corporation) were weighed in an argon gas atmosphere in a glove box (dew point: −80° C.) so that the molar ratio was 1:0.2, and subjected to mechanical milling (ball diameter: 4 mm; rotation speed: 270 rpm) with a ball mill apparatus (PL-7 produced by Fritsch) for 30 hours to synthesize phosphorus-containing low-crystalline vanadium sulfide $P_{0.2}VS_{4.0}$ (a-$P_{0.2}VS_{4.0}$).

Example 7-2: Milling for 45 Hours

Phosphorous-containing low-crystalline vanadium sulfate $P_{0.2}VS_{4.0}$ (a-$P_{0.2}VS_{4.0}$) was synthesized in the same manner as in Example 7-1, except that the mechanical milling was performed for 45 hours.

Example 7-3: Milling for 105 Hours

Phosphorus-containing low-crystalline vanadium sulfide $P_{0.2}VS_{4.0}$ (a-$P_{0.2}VS_{4.0}$) was synthesized in the same manner as in Example 7-1, except that the mechanical milling was performed for 105 hours.

Example 8: Synthesis of $P_{0.3}VS_{4.0}$ Powder

Example 8-1: Milling for 30 Hours

Crystalline $VS_4$ (c-$VS_4$) and elemental phosphorus (P; produced by Fujifilm Wako Pure Chemical Corporation) were weighed in an argon gas atmosphere in a glove box (dew point: −80° C.) so that the molar ratio was 1:0.3, and subjected to mechanical milling (ball diameter: 4 mm; rotation speed: 270 rpm) with a ball mill apparatus (PL-7 produced by Fritsch) for 30 hours to synthesize phosphorus-containing low-crystalline vanadium sulfide $P_{0.3}VS_{4.0}$ (a-$P_{0.3}VS_{4.0}$).

Example 8-2: Milling for 45 Hours

Phosphorus-containing low-crystalline vanadium sulfide $P_{0.3}VS_{4.0}$ (a-$P_{0.3}VS_{4.0}$) was synthesized in the same manner as in Example 8-1, except that the mechanical milling was performed for 45 hours.

Example 8-3: Milling for 105 Hours

Phosphorus-containing low-crystalline vanadium sulfide $P_{0.3}VS_{4.0}$ (a-$P_{0.3}VS_{4.0}$) was synthesized in the same manner as in Example 8-1, except that the mechanical milling was performed for 105 hours.

Example 9: Synthesis of $P_{0.4}VS_{4.0}$ Powder

Example 9-1: Milling for 30 Hours

Crystalline $VS_4$ (c-$VS_4$) and elemental phosphorus (P; produced by Fujifilm Wako Pure Chemical Corporation) were weighed in an argon gas atmosphere in a glove box (dew point: $-80°$ C.) so that the molar ratio was 1:0.4, and subjected to mechanical milling (ball diameter: 4 mm; rotation speed: 270 rpm) with a ball mill apparatus (PL-7 produced by Fritsch) for 30 hours to synthesize phosphorus-containing low-crystalline vanadium sulfide $P_{0.4}VS_{4.0}$ (a-$P_{0.4}VS_{4.0}$).

Example 9-2: Milling for 45 Hours

Phosphorus-containing low-crystalline vanadium sulfide $P_{0.4}VS_{4.0}$ (a-$P_{0.4}VS_{4.0}$) was synthesized in the same manner as in Example 9-1, except that the mechanical milling was performed for 45 hours.

Example 9-3: Milling for 105 Hours

Phosphorus-containing low-crystalline vanadium sulfide $P_{0.4}VS_{4.0}$ (a-$P_{0.4}VS_{4.0}$) was synthesized in the same manner as in Example 9-1, except that the mechanical milling was performed for 105 hours.

Example 10: Synthesis of $P_{0.5}VS_{4.0}$ Powder

Example 10-1: Milling for 30 Hours

Crystalline $VS_4$ (c-$VS_4$) and elemental phosphorus (P; produced by Fujifilm Wako Pure Chemical Corporation) were weighed in an argon gas atmosphere in a glove box (dew point: $-80°$ C.) so that the molar ratio was 1:0.5, and subjected to mechanical milling (ball diameter: 4 mm; rotation speed: 270 rpm) with a ball mill apparatus (PL-7 produced by Fritsch) for 30 hours to synthesize phosphorus-containing low-crystalline vanadium sulfide $P_{0.5}VS_{4.0}$ (a-$P_{0.5}VS_{4.0}$).

Example 10-2: Milling for 45 Hours

Phosphorus-containing low-crystalline vanadium sulfide $P_{0.5}VS_{4.0}$ (a-$P_{0.5}VS_{4.0}$) was synthesized in the same manner as in Example 10-1, except that the mechanical milling was performed for 45 hours.

Example 10-3: Milling for 105 Hours

Phosphorus-containing low-crystalline vanadium sulfide $P_{0.5}VS_{4.0}$ (a-$P_{0.5}VS_{4.0}$) was synthesized in the same manner as in Example 10-1, except that the mechanical milling was performed for 105 hours.

Test Example 1: X-ray Diffraction

The X-ray diffraction (XRD) of the powders obtained in Examples 1 to 4 and Comparative Example 1 was measured under the following conditions:

Measuring device: D8 ADVANCE (Bruker AXS)
X-ray source: Cu Kα 40 kV/40 mA
0.1° step
Scan rate: 0.02°/sec.
FIG. 1 shows the results.

The X-ray diffractogram in FIG. 1 shows that all of the samples of Examples 1 to 4 obtained by performing mechanical milling for 15 hours, 30 hours, 45 hours, and 60 hours had peaks at 15.0°, 24.3°, 33.0°, 36.5°, and 54.0° in the diffraction angle range of 2θ=10° to 80°, and had patterns similar to that of $VS_4$. In the samples of Examples 1 to 4, the full width at half maximum of the peak with a local maximum at 2θ=15.0° was 2.0° to 2.8°. In all of the samples, there was no peak at a position of 2θ=23.0°, indicating disappearance of the sulfur peak. Moreover, since no peak was present at a position of 2θ=45.0° in any of the samples, the presence of a phosphorus-free low-crystalline vanadium sulfide could not be confirmed. For comparison, FIG. 1 also shows the peaks of vanadium sulfide (III) and phosphorus sulfide (V), and crystalline $VS_4$ (c-$VS_4$), which are raw materials and an intermediate. The full width at half maximum of the peak at 2θ=15.0° in crystalline $VS_4$ was 0.17°, which is clearly different from the values in the samples of Examples 1 to 4 (2.0° to) 2.8°, clearly indicating that the samples of Examples 1 to 4 were low crystalline.

Figure 16:
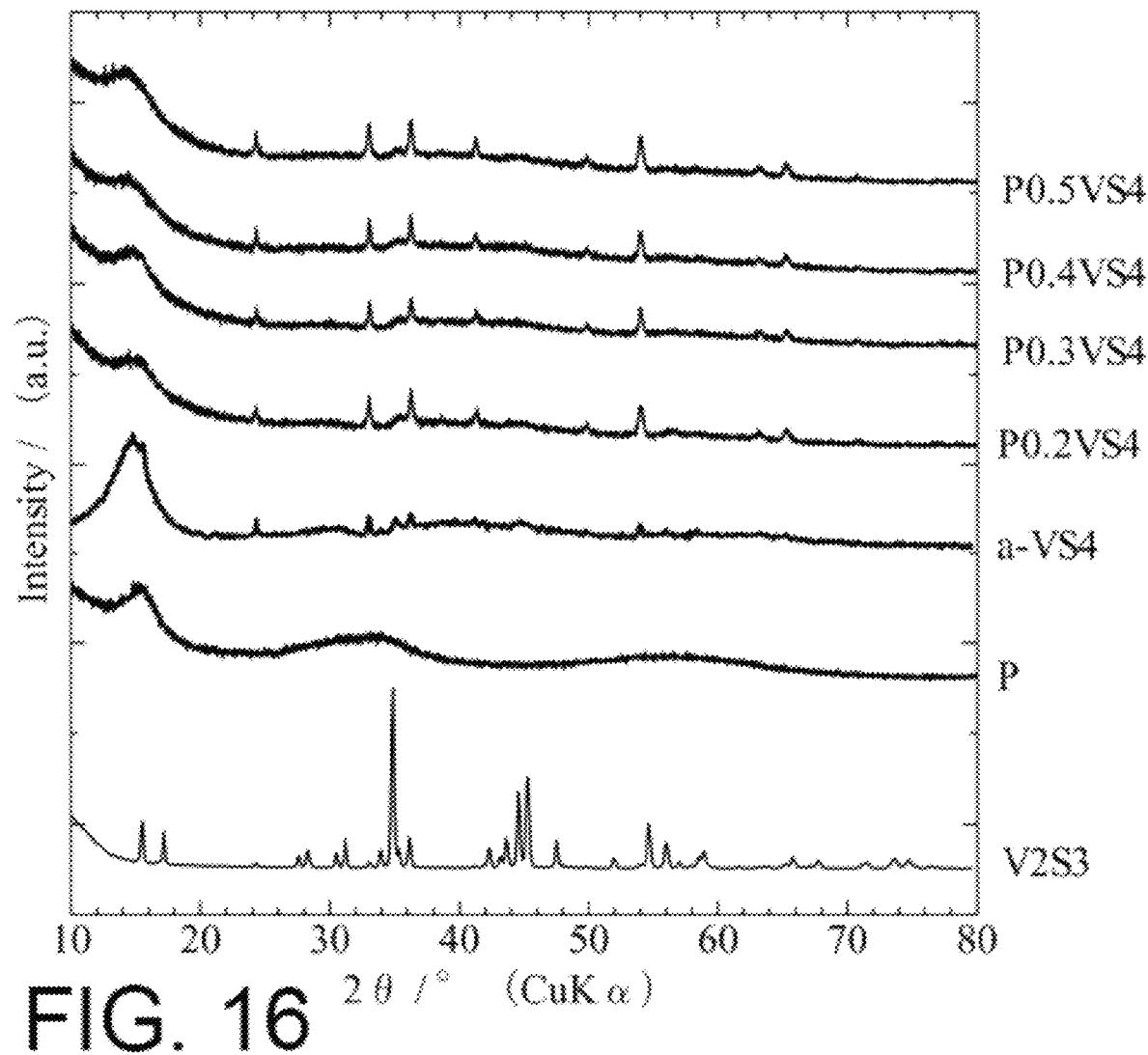
FIG. 16 shows an X-ray diffractogram of the powders obtained in Examples 7 to 10.
Figure 17:
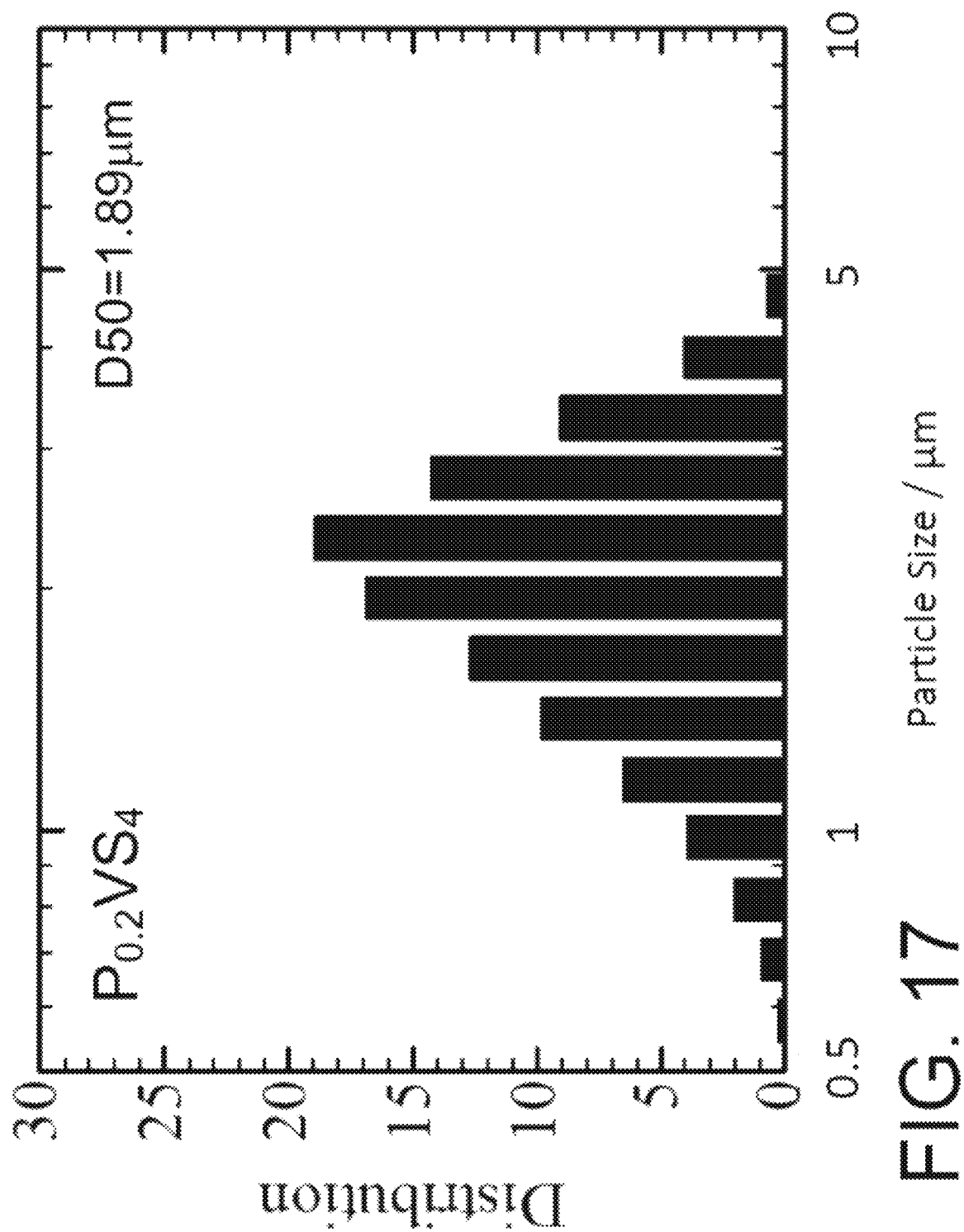
FIG. 17 shows a particle size distribution of the $P_{0.2}VS_4$ powder obtained in Example 7.
Figure 18:
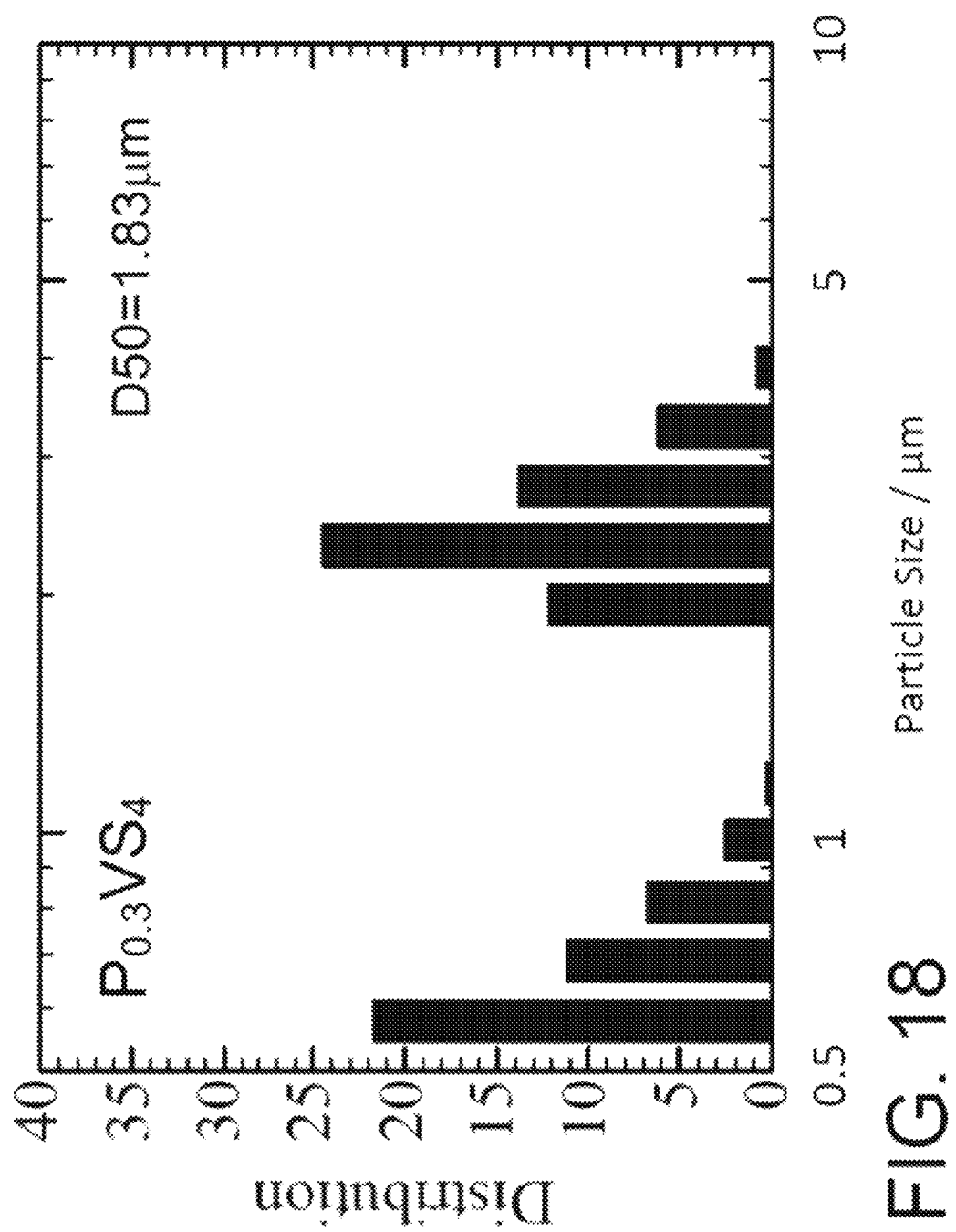
FIG. 18 shows a particle size distribution of the $P_{0.3}VS_4$ powder obtained in Example 8.
Figure 19:
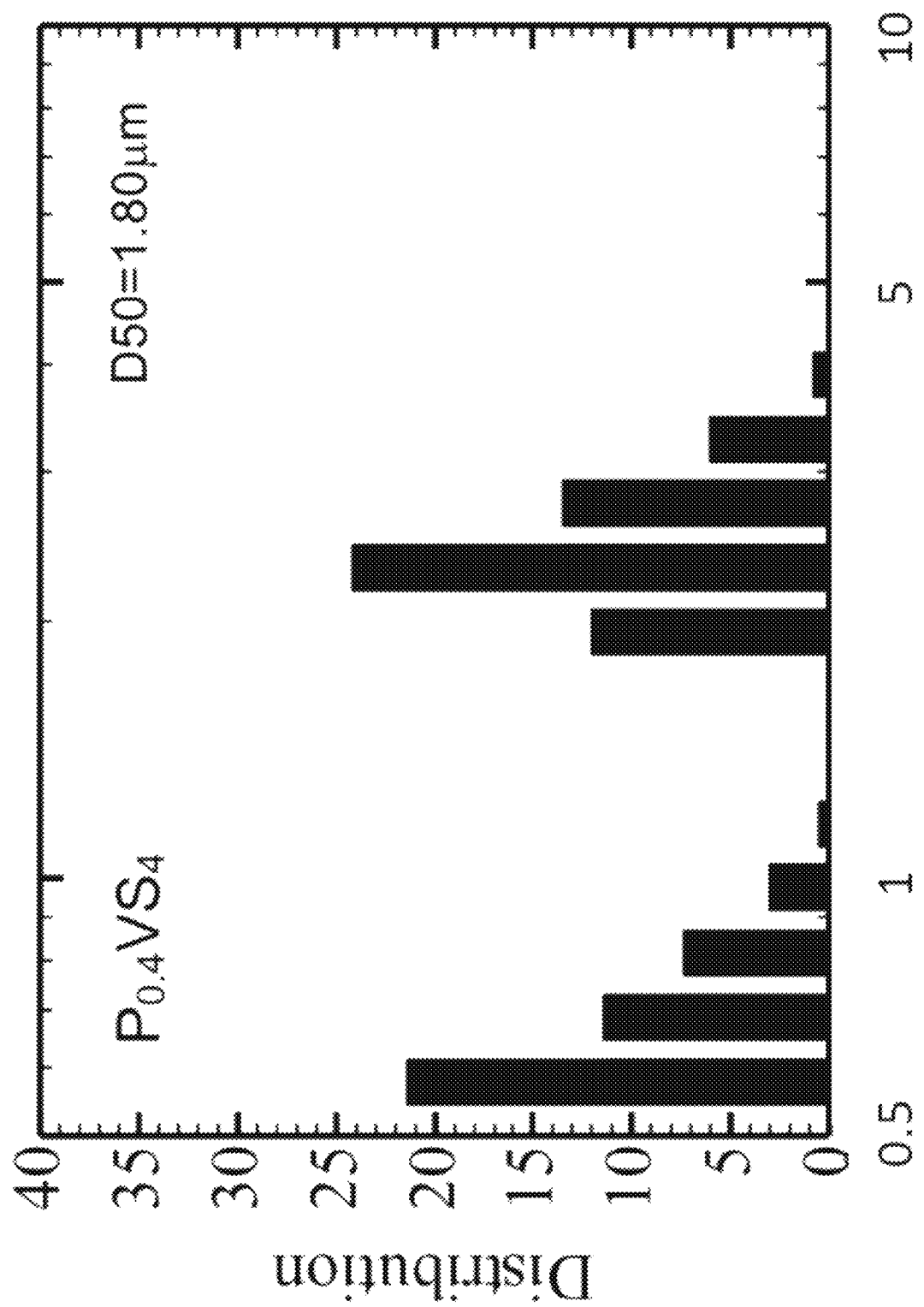
FIG. 19 shows a particle size distribution of the $P_{0.4}VS_4$ powder obtained in Example 9.
Figure 20:
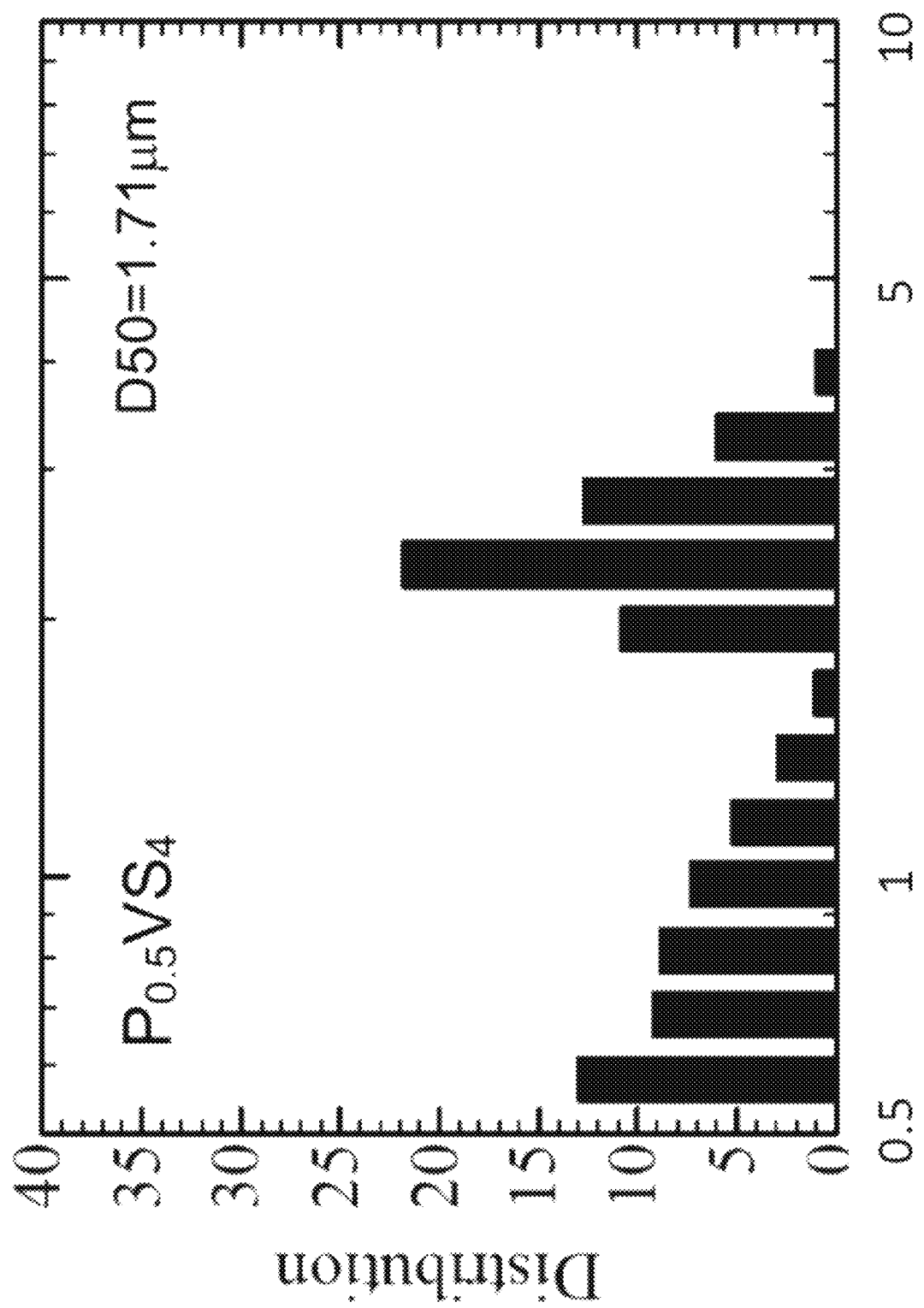
FIG. 20 shows a particle size distribution of the $P_{0.5}VS_4$ powder obtained in Example 10.

The X-ray diffractogram in FIG. 16 shows that all of the samples of Examples 7 to 9 obtained by performing mechanical milling for 30 hours, 45 hours, and 105 hours had peaks at 15.0°, 24.3°, 33.0°, 36.5°, and 54.0° in the diffraction angle range of 2θ=10° to 80°, and had patterns similar to that of $VS_4$. In the samples of Examples 7 to 9, the full width at half maximum of the peak with a local maximum at 2θ=15.0° was 2.0 to 2.8°. In all of the samples, there was no peak at a position of 2θ=23.0°, indicating disappearance of the sulfur peak. Moreover, since no peak was present at a position of 2θ=45.0° in any of the samples, the presence of a phosphorus-free low-crystalline vanadium sulfide could not be confirmed. For comparison, FIG. 16 also shows the peaks of vanadium sulfide (III) and elemental phosphorus, which are raw materials.

Test Example 2: Particle Size Distribution

The particle size distribution and average particle size D50 of the $VS_4$ powder obtained in Comparative Example 1, the $P_{0.1}VS_{4.25}$ powder obtained in Example 1-1, the $P_{0.2}VS_{4.50}$ powder obtained in Example 2-1, the $P_{0.4}VS_{5.00}$ powder obtained in Example 4-1, the $P_{0.5}VS_{6.00}$ powder obtained in Example 5, and the $PVS_{8.00}$ powder obtained in Example 6 were measured with a particle size distribution analyzer (Nikkiso Co., Ltd., AEROTRAC SPR MODEL: 7340). FIGS. 2 to 7 show the results. The results of the measurement show that in each sample, the average particle size was about 1 μm (0.93 to 1.12 μm), and that the broadening of the X-ray diffraction pattern was not due to the particle size, but was due to a decrease in the crystallinity of the material (low crystallinity).

The particle size distribution and average particle size D50 of the $P_{0.2}VS_4$ powder obtained in Example 7, the $P_{0.3}VS_4$ powder obtained in Example 8, the $P_{0.4}VS_4$ powder obtained in Example 9, and the $P_{0.5}VS_4$ powder obtained in Example 10 were measured with a particle size distribution analyzer (Nikkiso Co., Ltd., AEROTRAC SPR MODEL: 7340). FIGS. 17 to 20 show the results. The results of the measurement show that in each sample, the average particle size was about 1 μm (1.71 to 1.89 μm), and that the broadening of the X-ray diffraction pattern was not due to the particle size, but was due to a decrease in the crystallinity of the material (low crystallinity).

Test Example 3: Charge-and-Discharge Test

Electrochemical cells for testing (lithium secondary batteries) were produced by the following method using the $VS_4$ powder obtained in Comparative Example 1, the $P_{0.1}VS_{4.25}$ powder obtained in Example 1-1, the $P_{0.2}VS_{4.50}$ powder obtained in Example 2-1, the $P_{0.4}VS_{5.00}$ powder obtained in Example 4-1, the $P_{0.5}VS_{6.00}$ powder obtained in Example 5, the $PVS_{8.00}$ powder obtained in Example 6, the $P_{0.2}VS_{4.00}$ powder obtained in Example 7-1, the $P_{0.3}VS_{4.00}$ powder obtained in Example 8-1, the $P_{0.4}VS_{4.00}$ powder obtained in Example 9-1, or the $P_{0.5}VS_{4.00}$ powder obtained in Example 10-1 as a cathode active material; and constant-current charge-and-discharge measurement was performed at 30° C. at a charge-and-discharge rate of 0.1 C (1 C=1197 mAh/g) in the voltage range of 1.5 to 2.6 V (1.5 to 3.0 V for the $PVS_{8.00}$ powder obtained in Example 6) with a pause of 10 minutes between cycles.

The method for producing the electrochemical cells for testing was as follows. First, 5 mg of Ketjenblack® and 2 mg of polytetrafluoroethylene (PTFE) as a binder were added to 10 mg of the $VS_4$ powder obtained in Comparative Example 1, the $P_{0.1}VS_{4.25}$ powder obtained in Example 1-1, the $P_{0.2}VS_{4.50}$ powder obtained in Example 2-1, the $P_{0.4}VS_{5.00}$ powder obtained in Example 4-1, the $P_{0.5}VS_{6.00}$ powder obtained in Example 5, the $PVS_{8.00}$ powder obtained in Example 6, the $P_{0.2}VS_{4.00}$ powder obtained in Example 7-1, the $P_{0.3}VS_{4.00}$ powder obtained in Example 8-1, the $P_{0.4}VS_{4.00}$ powder obtained in Example 9-1, or the $P_{0.5}VS_{4.00}$ powder obtained in Example 10-1. After mixing with a mortar for 8 minutes, the resulting mixture was applied to an aluminum mesh to form a working electrode (cathode). As a counter electrode (anode), lithium metal was used. As an electrolyte, a solution of 1M lithium hexafluorophosphate ($LiPF_6$) in a mixed solvent of ethylene carbonate (EC) and dimethyl carbonate (DMC) in a mass ratio of 1:1 (1M $LiPF_6$ EC/DMC) was used. As a separator, polypropylene was used.

Figure 8:
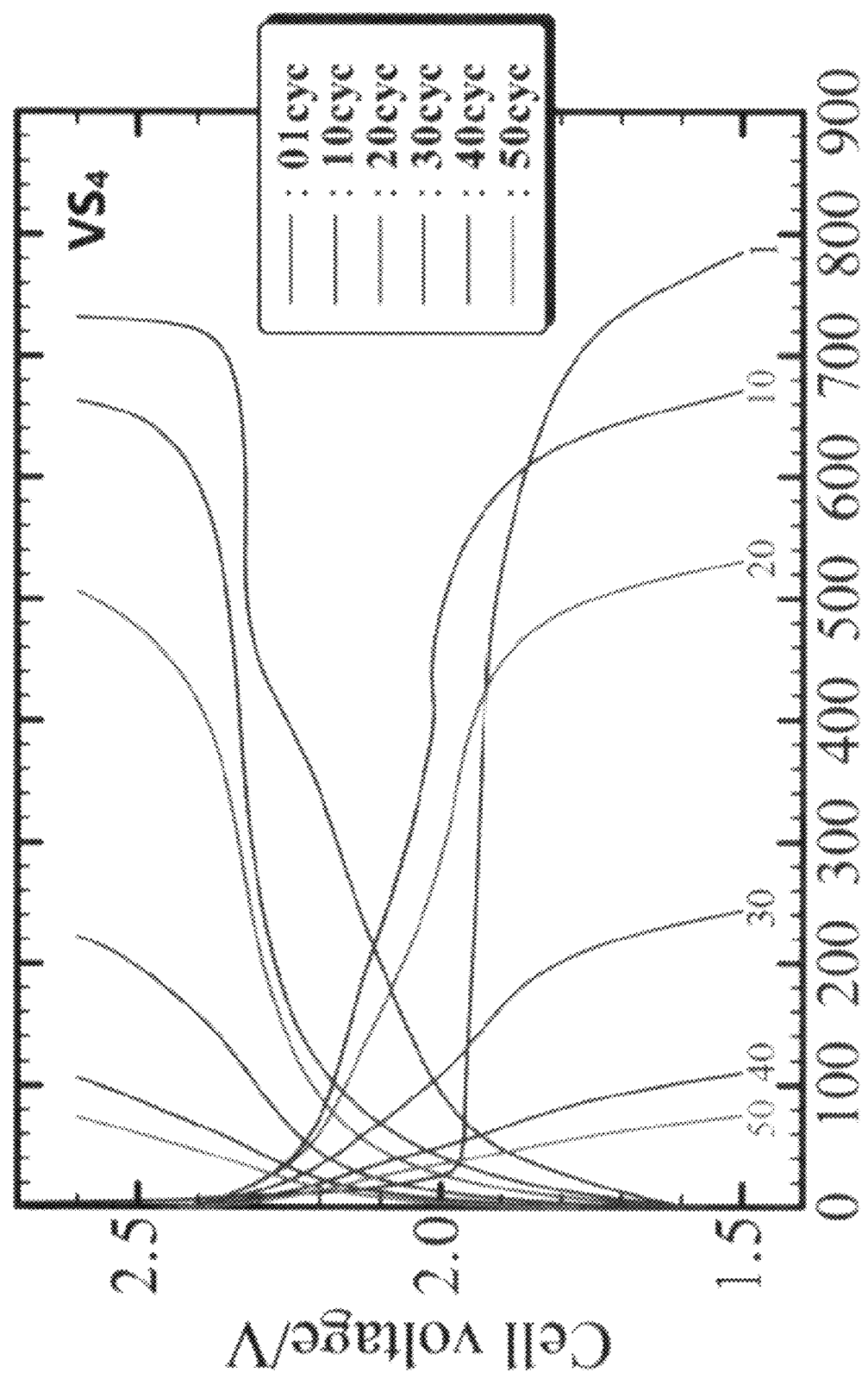
FIG. 8 shows charge-and-discharge curves (50 cycles) in the case of using the $VS_4$ powder obtained in Comparative Example 1.
Figure 9:
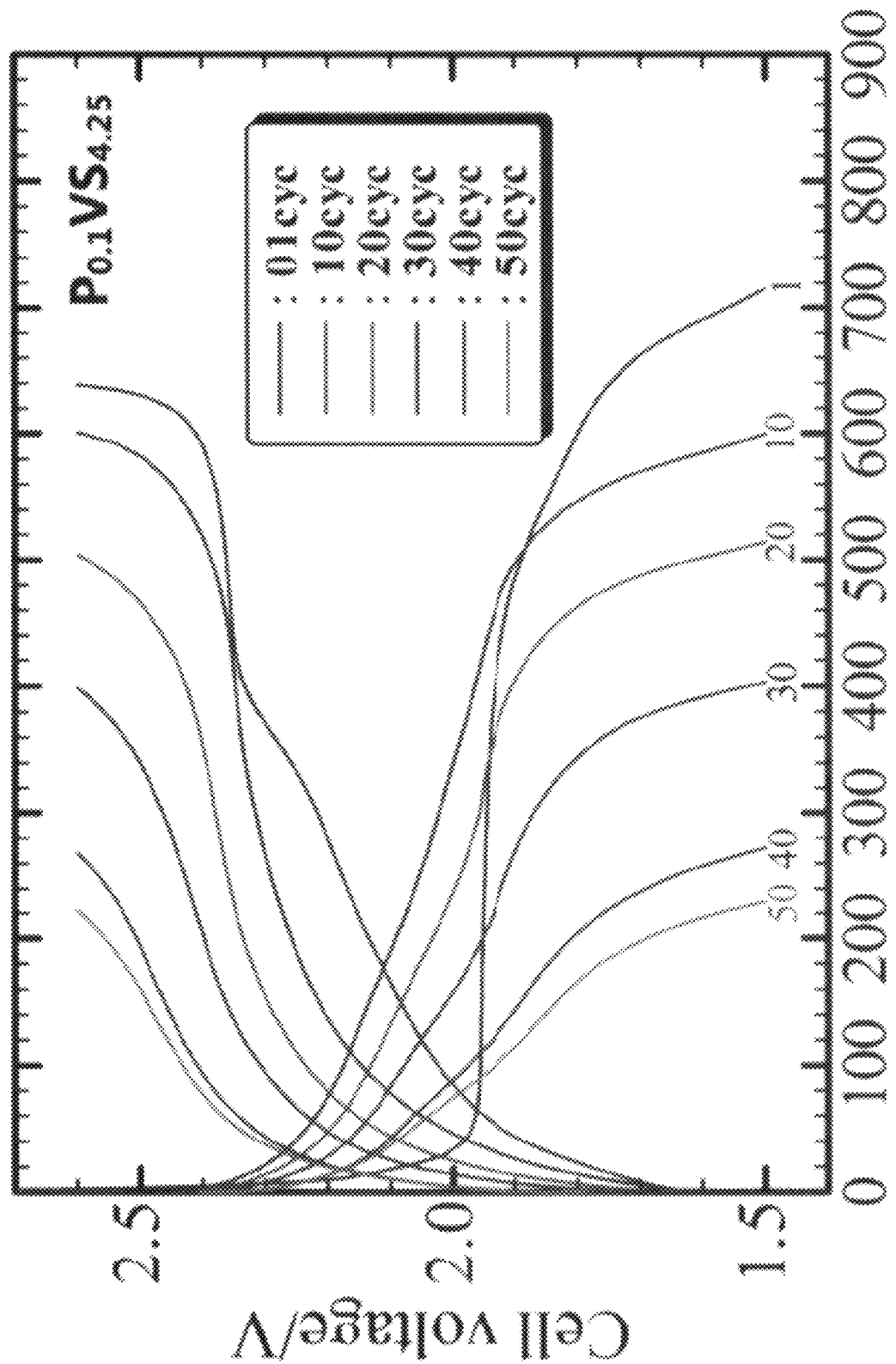
FIG. 9 shows charge-and-discharge curves (50 cycles) in the case of using the $P_{0.1}VS_{4.25}$ powder obtained in Example 1-1.
Figure 10:
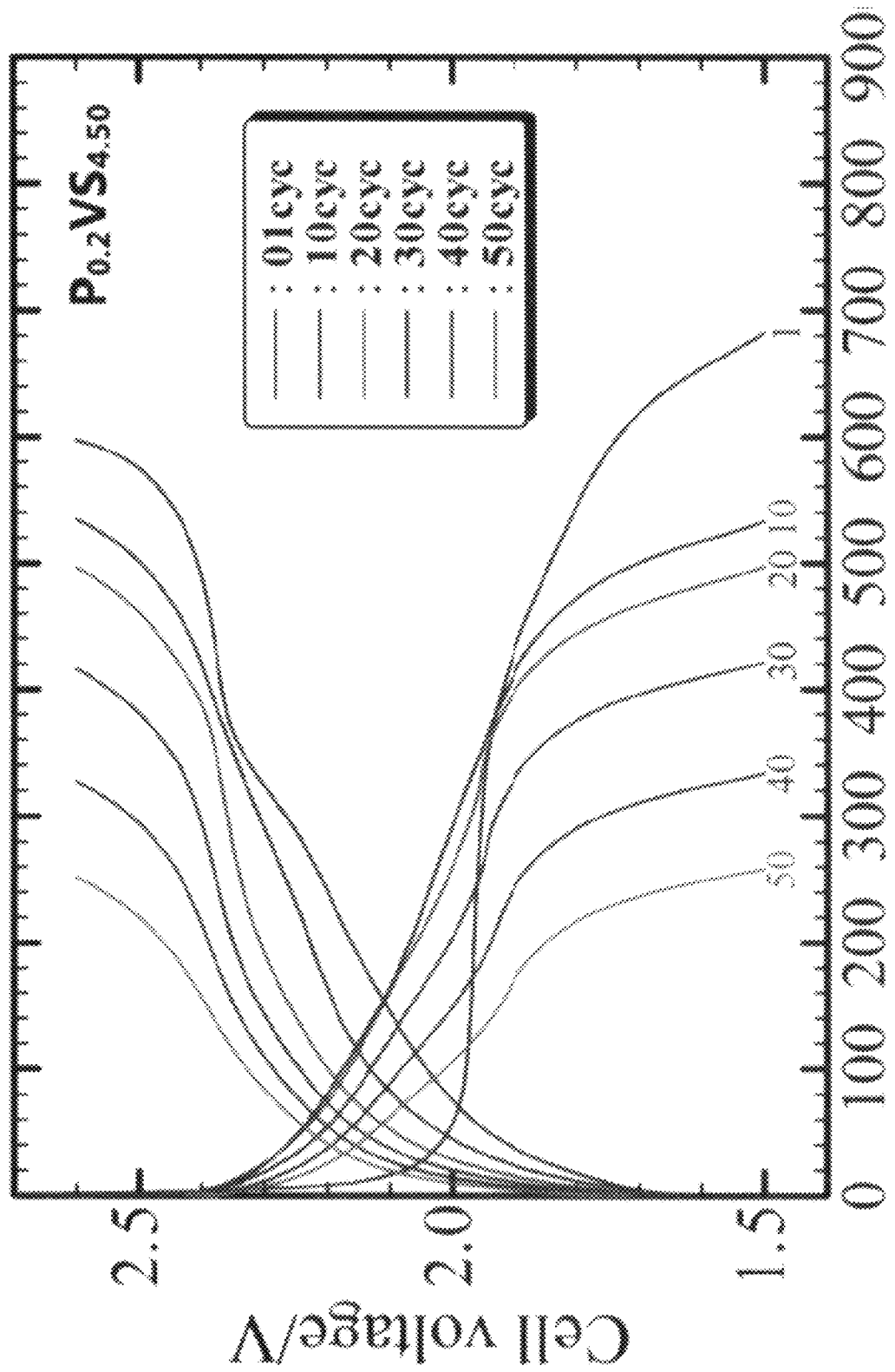
FIG. 10 shows charge-and-discharge curves (50 cycles) in the case of using the $P_{0.2}VS_{4.50}$ powder obtained in Example 2-1.
Figure 11:
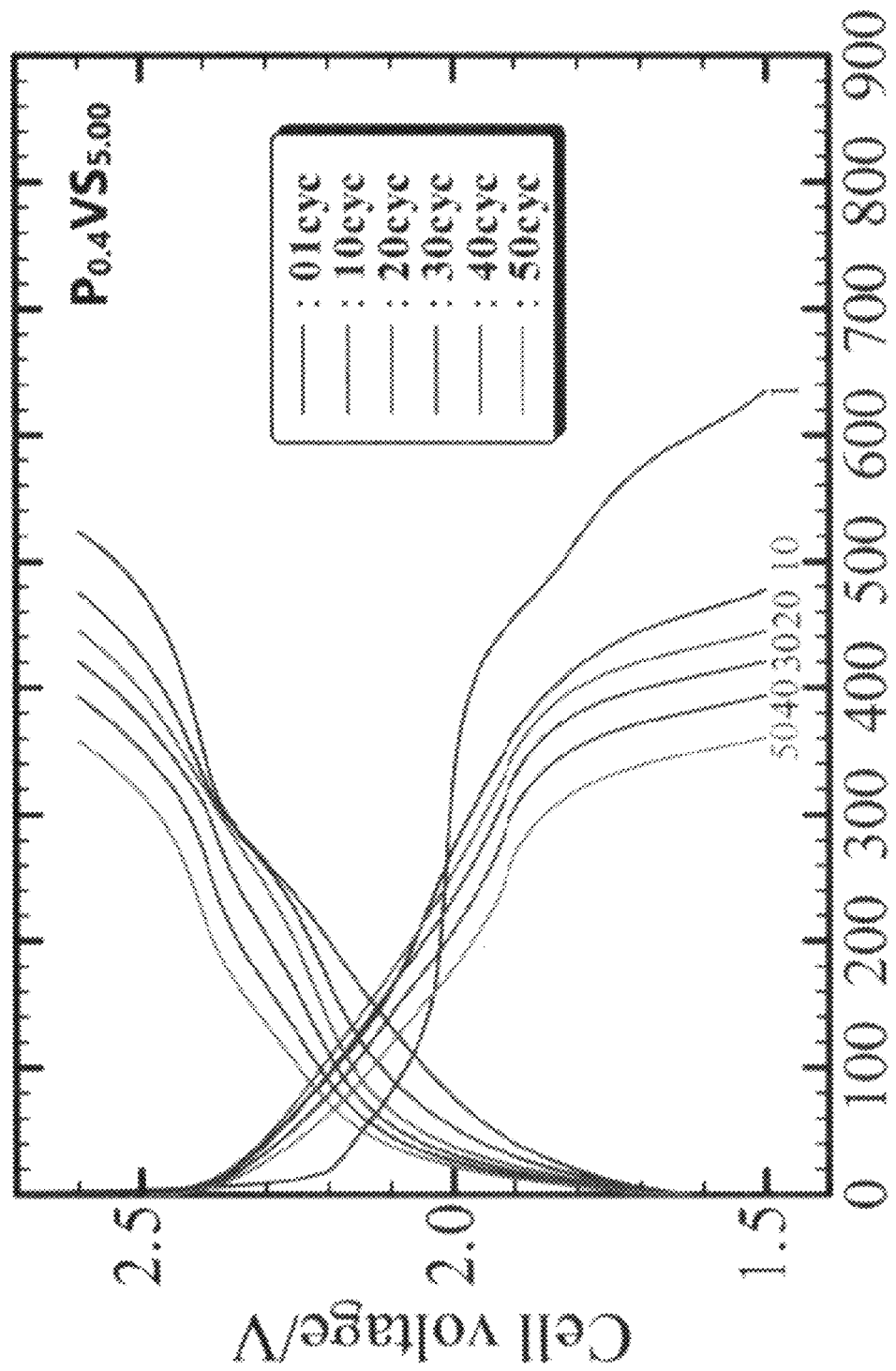
FIG. 11 shows charge-and-discharge curves (50 cycles) in the case of using the $P_{0.4}VS_{5.00}$ powder obtained in Example 4-1.
Figure 12:
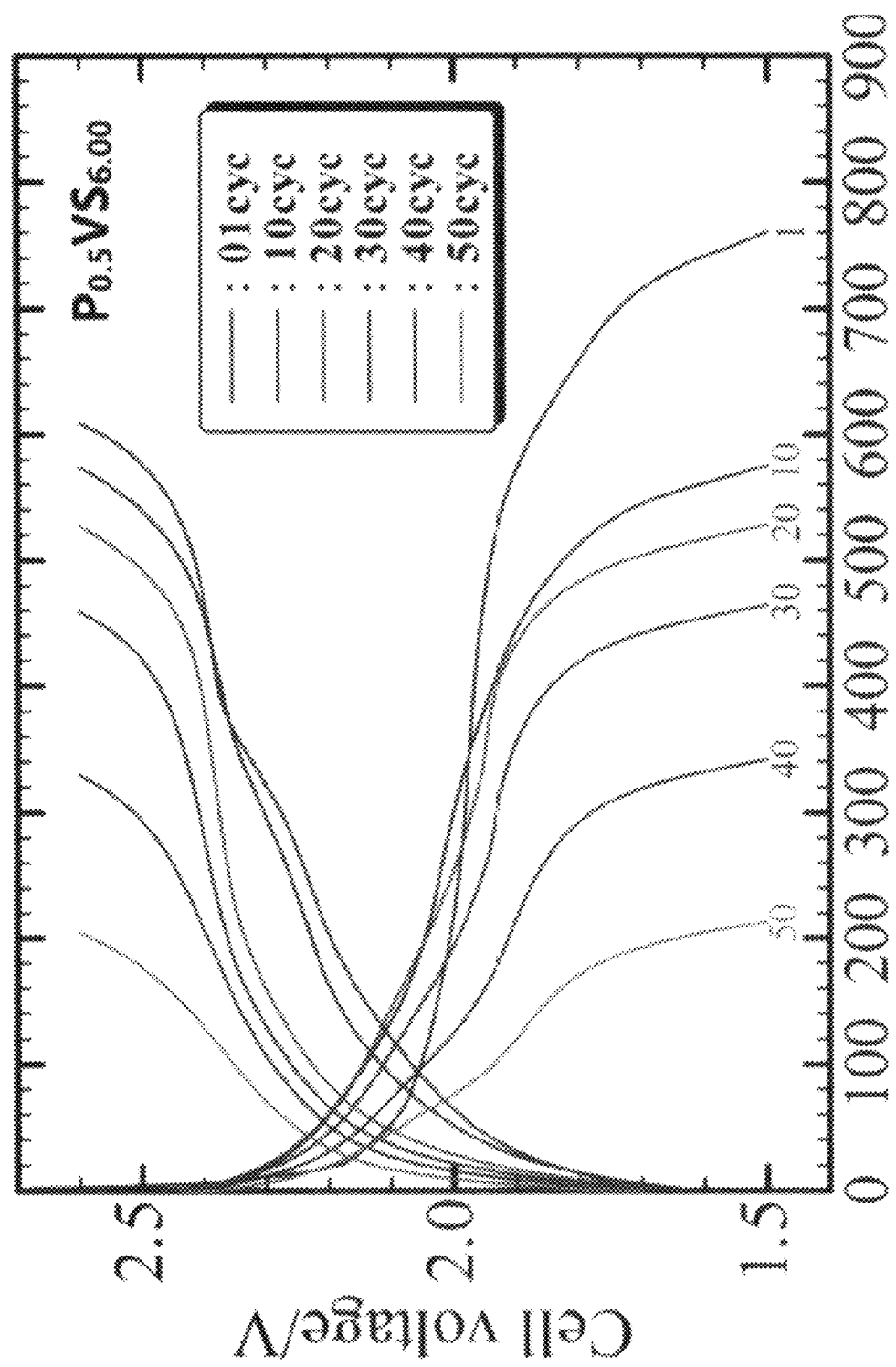
FIG. 12 shows charge-and-discharge curves (50 cycles) in the case of using the $P_{0.5}VS_{6.00}$ powder obtained in Example 5.
Figure 13:
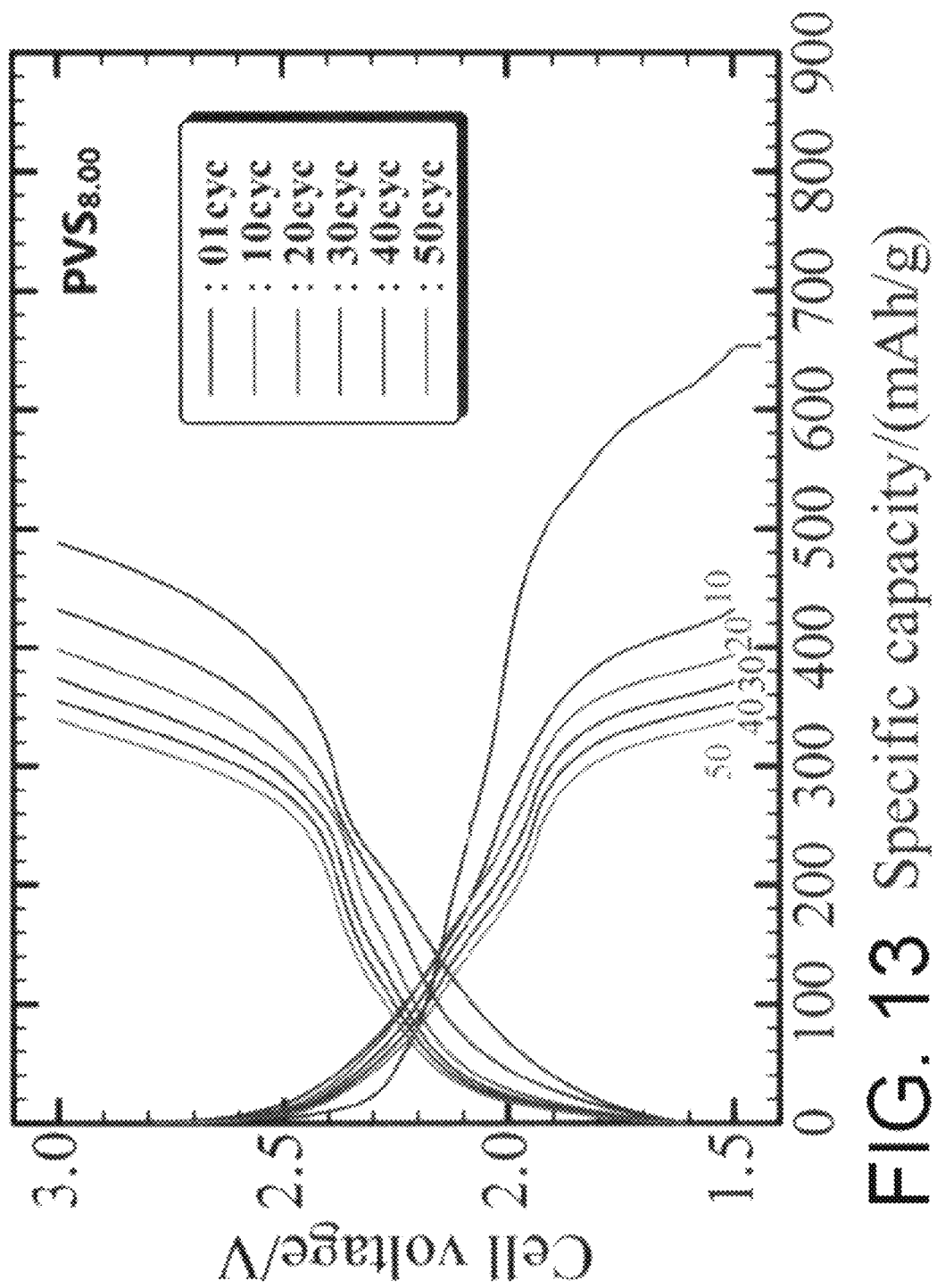
FIG. 13 shows charge-and-discharge curves (50 cycles) in the case of using the $PVS_{8.00}$ powder obtained in Example 6.

FIG. 8 shows charge-and-discharge curves (50 cycles) in the case of using the $VS_4$ powder obtained in Comparative Example 1. FIG. 9 shows charge-and-discharge curves (50 cycles) in the case of using the $P_{0.1}VS_{4.25}$ powder obtained in Example 1-1. FIG. 10 shows charge-and-discharge curves (50 cycles) in the case of using the $P_{0.2}VS_{4.50}$ powder obtained in Example 2-1. FIG. 11 shows charge-and-discharge curves (50 cycles) in the case of using the $P_{0.4}VS_{5.00}$ powder obtained in Example 4-1. FIG. 12 shows charge-and-discharge curves (50 cycles) in the case of using the $P_{0.5}VS_{6.00}$ powder obtained in Example 5. FIG. 13 shows charge-and-discharge curves (50 cycles) in the case of using the $PVS_{8.00}$ powder obtained in Example 6. The results show that all of the samples of the Examples had a sufficient initial specific capacity. It can also be understood that although the sample of the Comparative Example had a high initial discharge capacity, the discharge capacity from the 25th cycle onward was inferior to those of all of the samples of the Examples.

Figure 21:
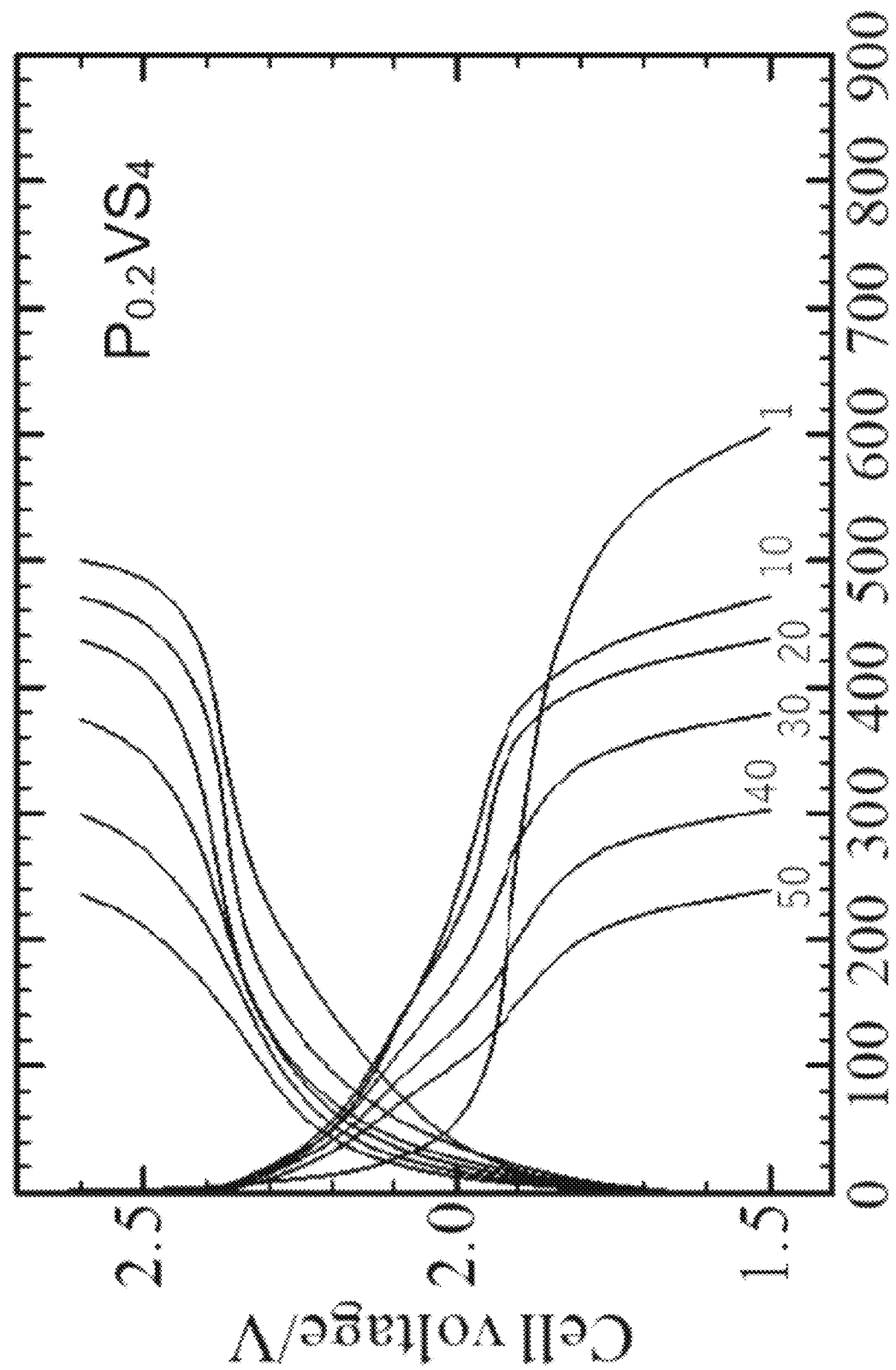
FIG. 21 shows charge-and-discharge curves (50 cycles) in the case of using the $P_{0.2}VS_4$ powder obtained in Example 7.
Figure 22:
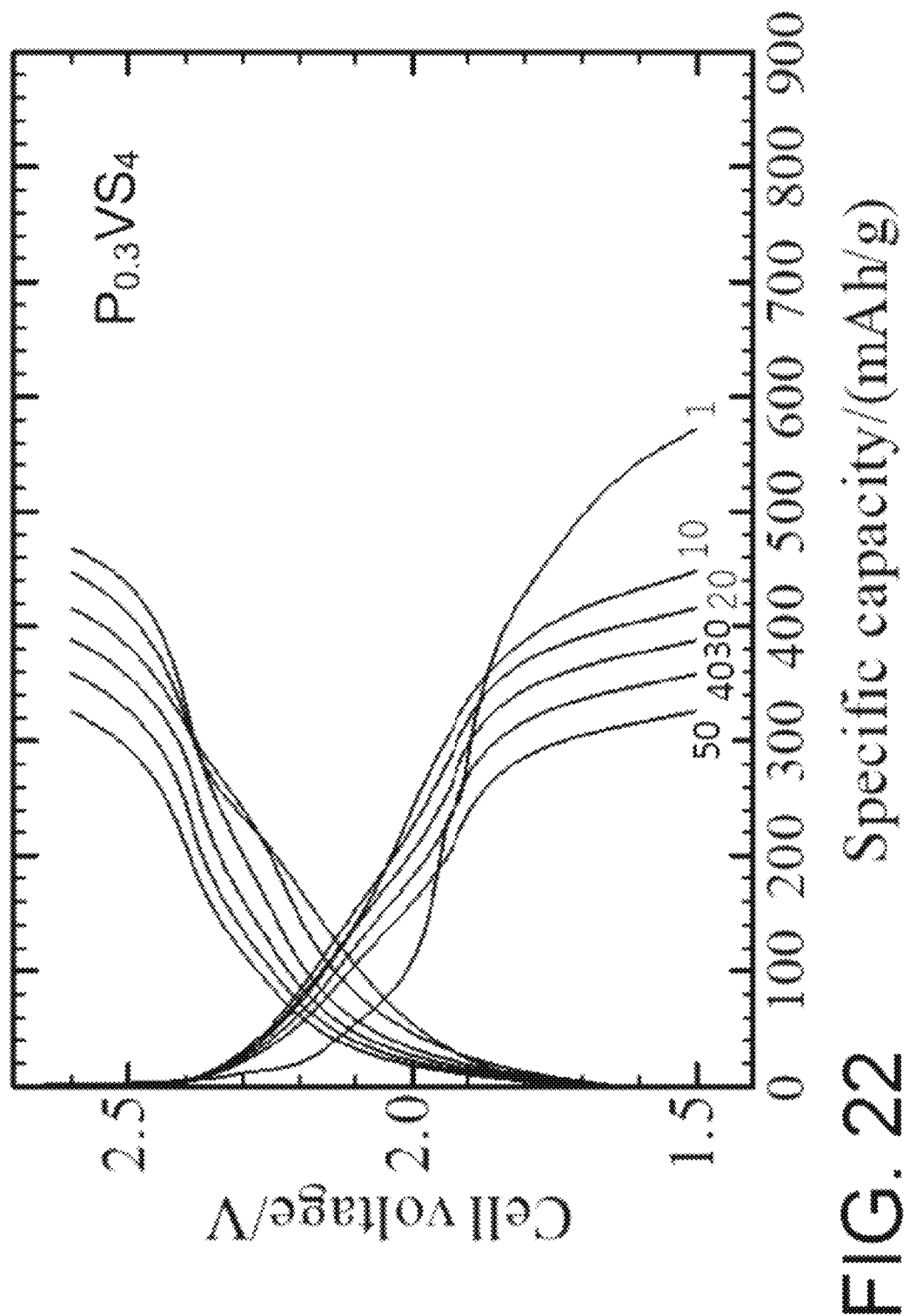
FIG. 22 shows charge-and-discharge curves (50 cycles) in the case of using the $P_{0.3}VS_4$ powder obtained in Example 8.
Figure 23:
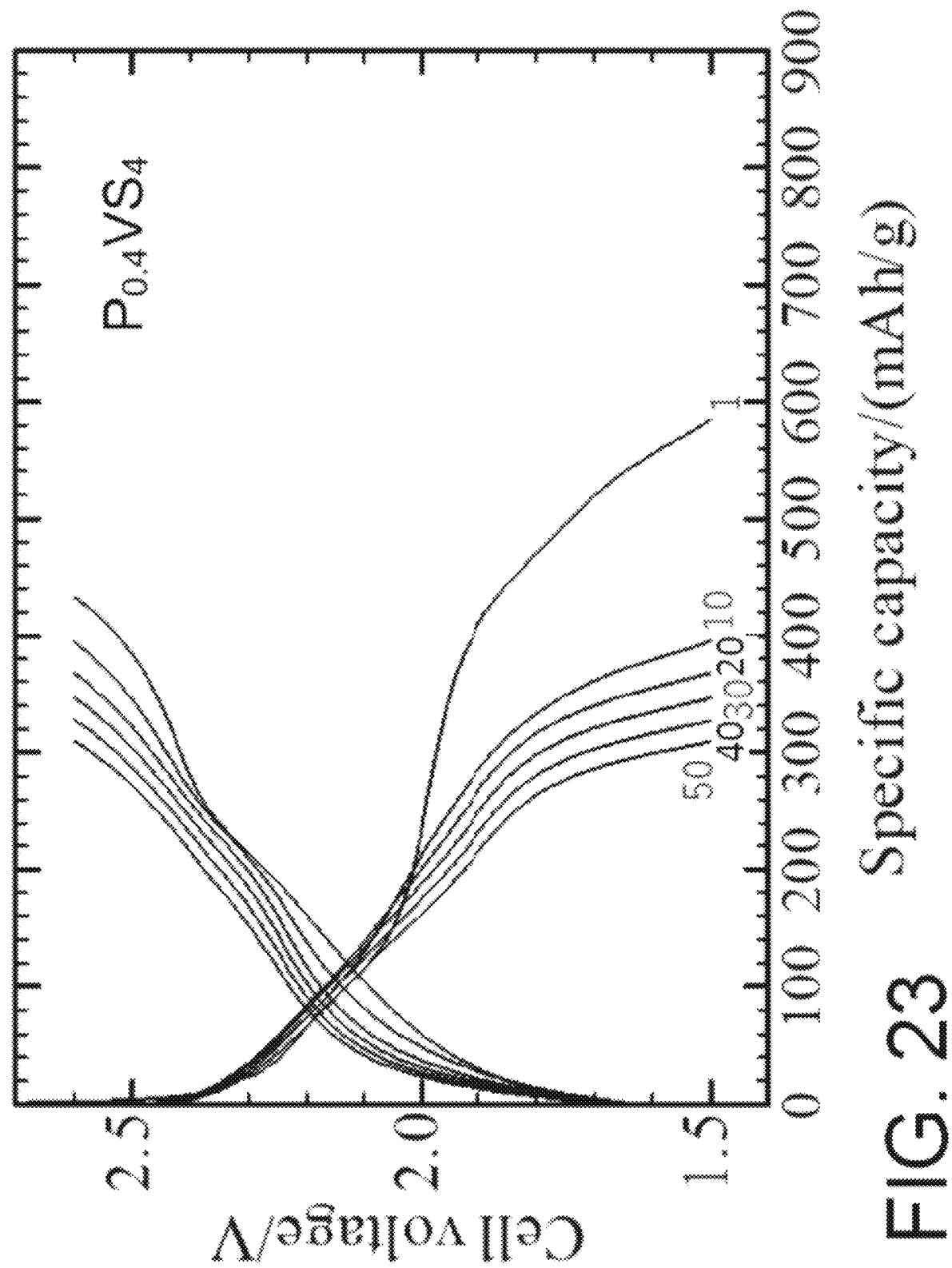
FIG. 23 shows charge-and-discharge curves (50 cycles) in the case of using the $P_{0.4}VS_4$ powder obtained in Example 9.
Figure 24:
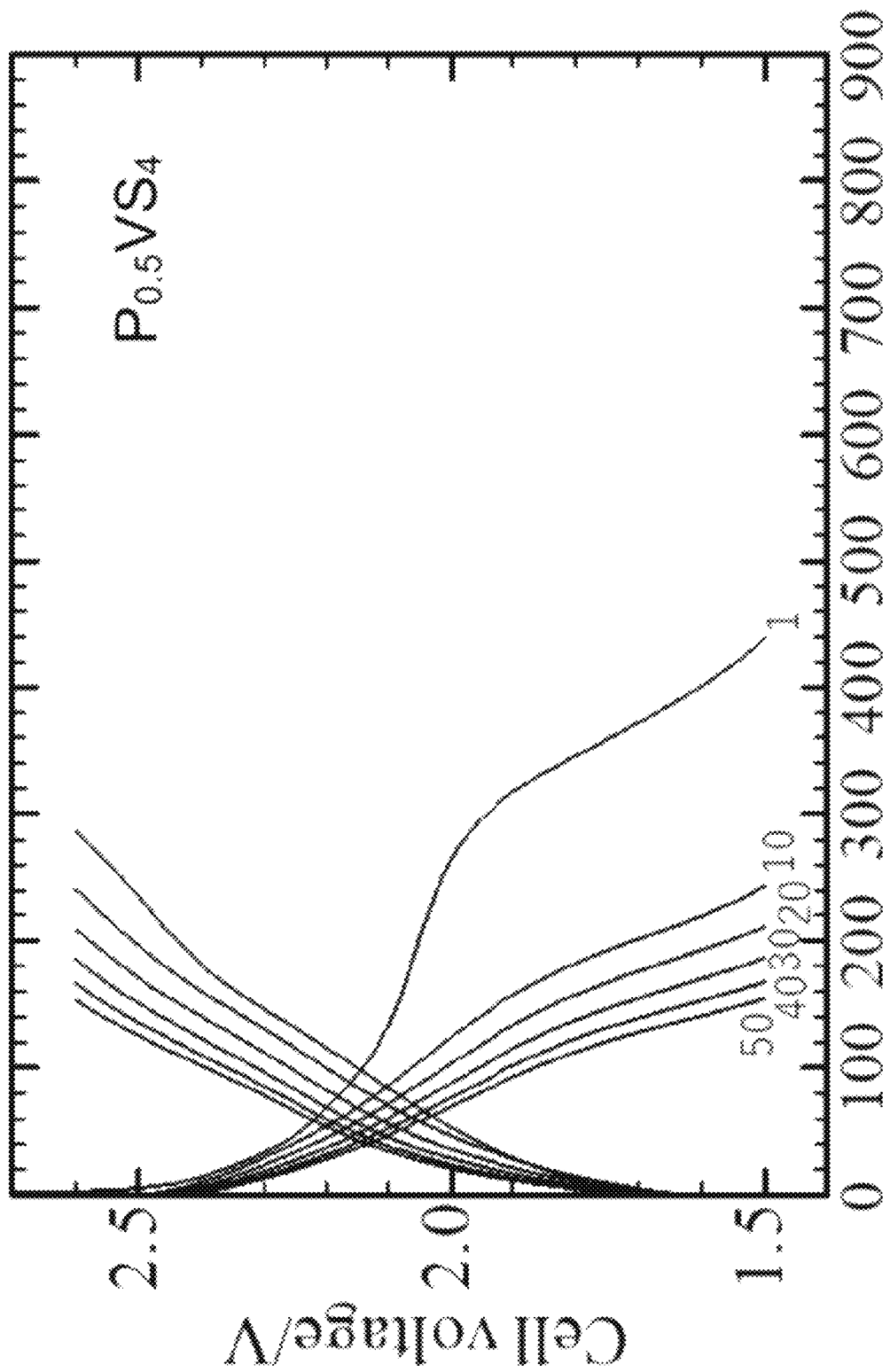
FIG. 24 shows charge-and-discharge curves (50 cycles) in the case of using the $P_{0.5}VS_4$ powder obtained in Example 8.

FIG. 21 shows charge-and-discharge curves (50 cycles) in the case of using the $P_{0.2}VS_{4.00}$ powder obtained in Example 7-1. FIG. 22 shows charge-and-discharge curves (50 cycles) in the case of using the $P_{0.3}VS_{4.00}$ powder obtained in Example 8-1. FIG. 23 shows charge-and-discharge curves (50 cycles) in the case of using the $P_{0.4}VS_{4.00}$ powder obtained in Example 9-1. FIG. 24 shows charge-and-discharge curves (50 cycles) in the case of using the $P_{0.5}VS_{4.00}$ powder obtained in Example 10-1. From these results, it can be understood that all of the samples of the Examples had a sufficient initial specific capacity.

Figure 14:
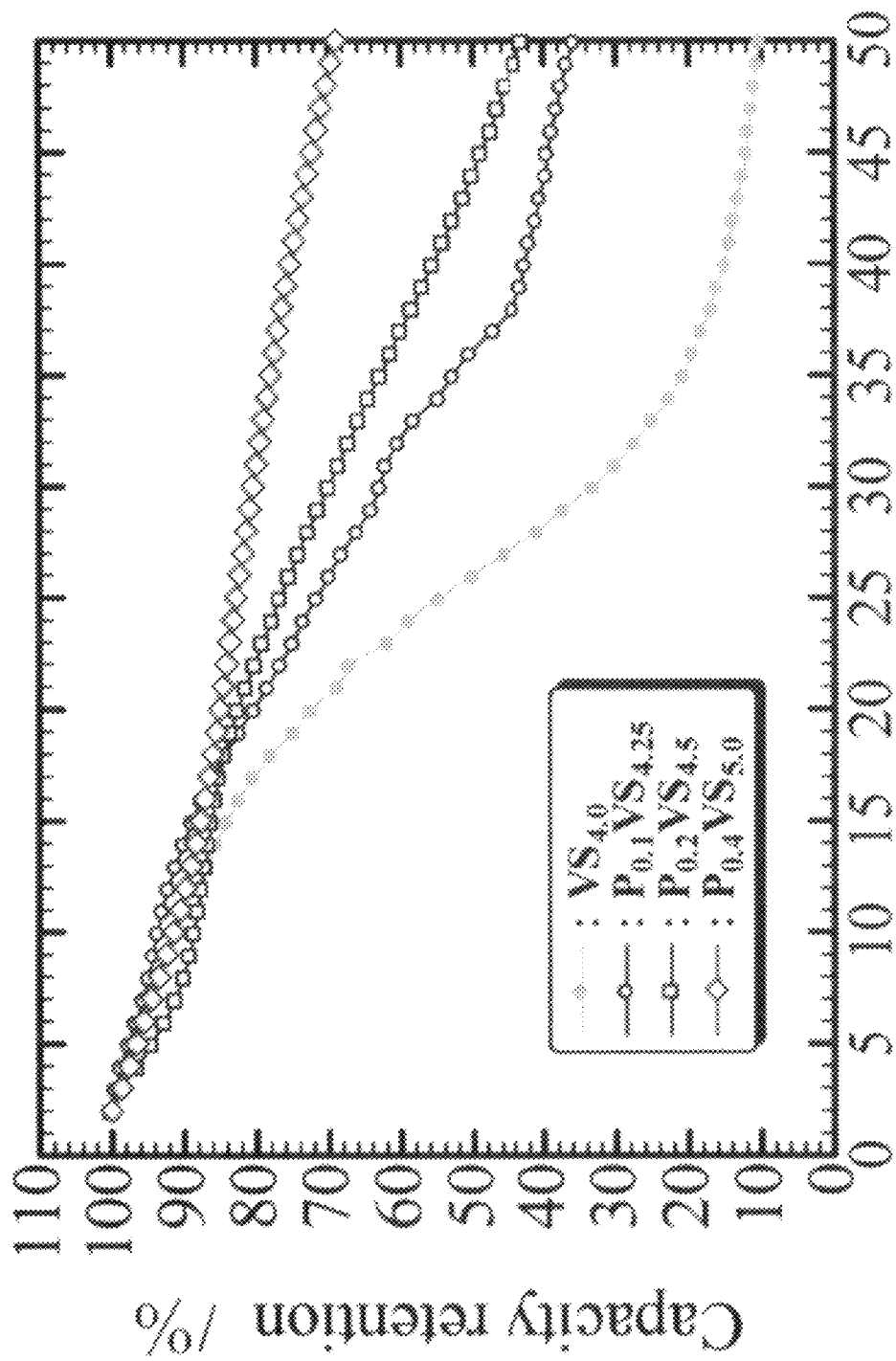
FIG. 14 shows capacity retention over charge-and-discharge cycles up to 50 cycles in the cases of using the $VS_4$ powder, the $P_{0.1}VS_{4.25}$ powder, the $P_{0.2}VS_{4.50}$ powder, and the $P_{0.4}VS_{5.00}$ powder, based on the discharge capacity of the second cycle taken as 100% in each case.

FIG. 14 shows capacity retention over charge-and-discharge cycles up to 50 cycles in the cases of using the $VS_4$ powder obtained in Comparative Example 1, the $P_{0.1}VS_{4.25}$ powder obtained in Example 1-1, the $P_{0.2}VS_{4.50}$ powder obtained in Example 2-1, and the $P_{0.4}VS_{5.00}$ powder obtained in Example 4-1, based on the discharge capacity of the second cycle taken as 100% in each case. From the results, it can be understood that all of the samples of the Examples had significantly improved charge-and-discharge cycle characteristics, compared with the sample of the Comparative Example.

Figure 25:
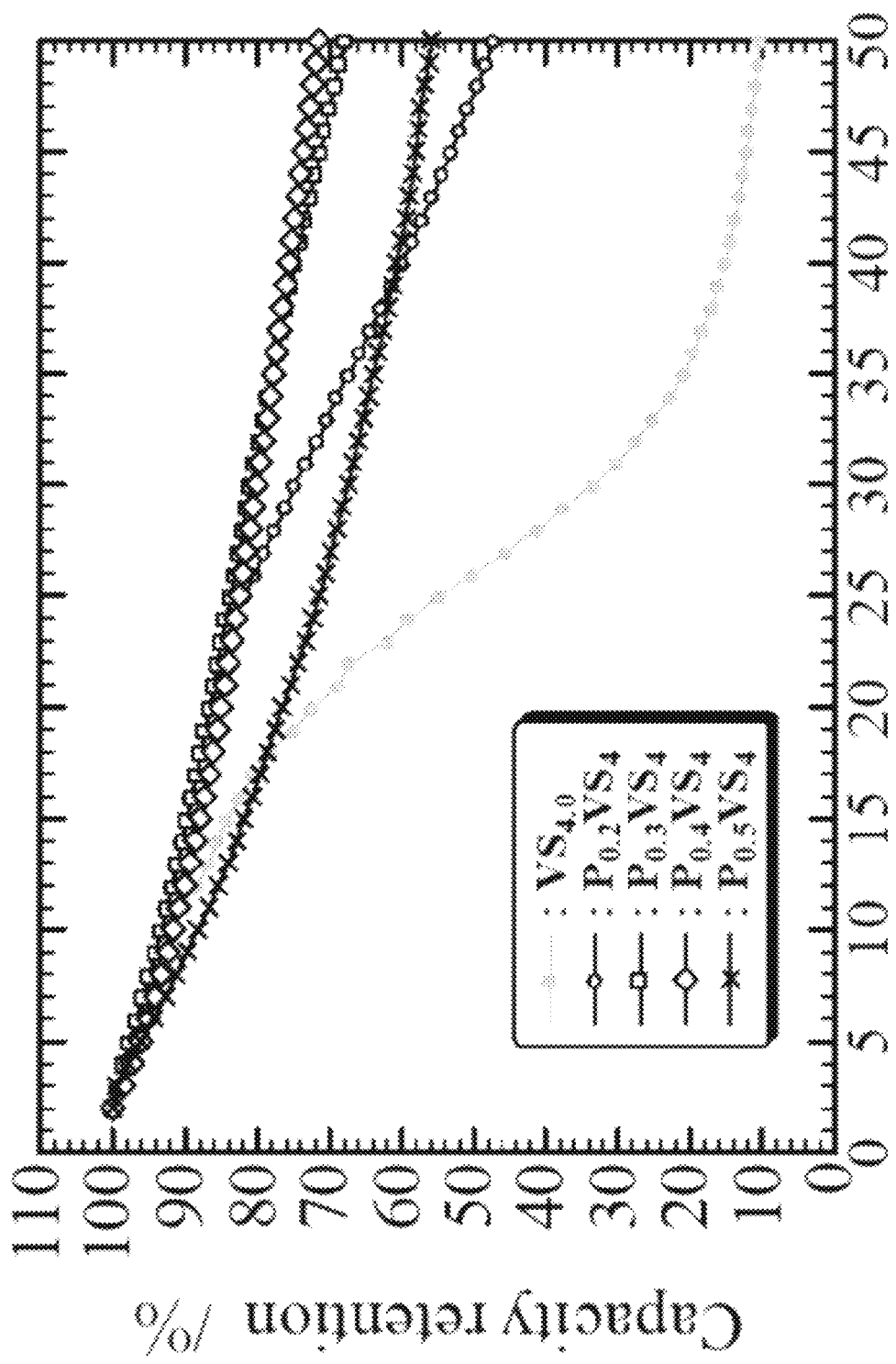
FIG. 25 shows capacity retention over charge-and-discharge cycles up to 50 cycles in the cases of using the $VS_4$ powder, the $P_{0.2}VS_4$ powder, the $P_{0.3}VS_4$ powder, the $P_{0.4}VS_4$ powder, and the $P_{0.5}VS_4$ powder, based on the discharge capacity of the second cycle taken as 100% in each case.

FIG. 25 shows capacity retention over charge-and-discharge cycles up to 50 cycles in the cases of using the $VS_4$ powder obtained in Comparative Example 1, the $P_{0.2}VS_{4.00}$ powder obtained in Example 7-1, the $P_{0.3}VS_{4.00}$ powder obtained in Example 8-1, and the $P_{0.4}VS_{4.00}$ powder obtained in Example 9-1, based on the discharge capacity of the second cycle taken as 100% in each case. From the results, it can be understood that all of the samples of the Examples had significantly improved charge-and-discharge cycle characteristics, compared with the sample of the Comparative Example.

Figure 15:
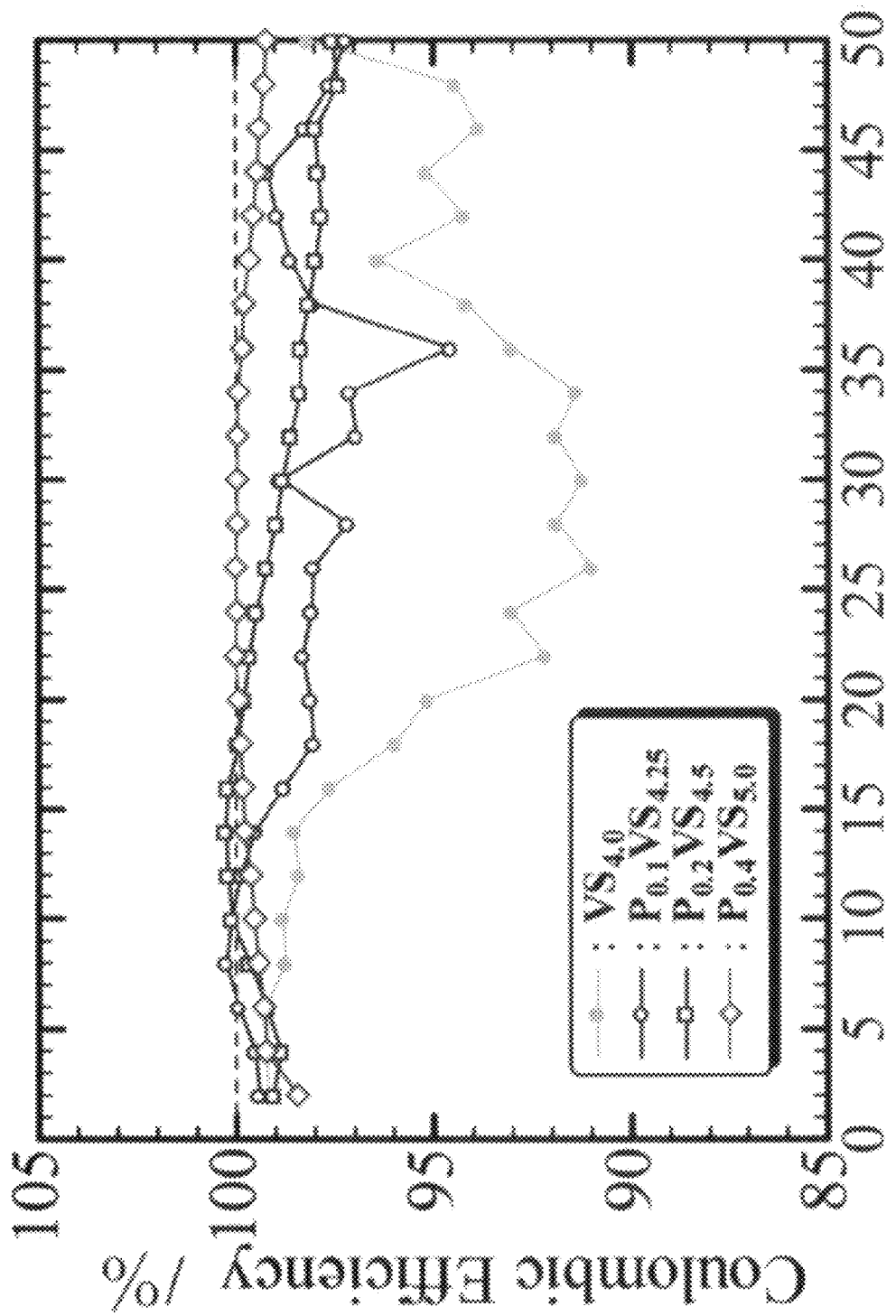
FIG. 15 shows coulombic efficiency in each charge-and-discharge cycle in the cases of using the $VS_4$ powder, the $P_{0.1}VS_{4.25}$ powder, the $P_{0.2}VS_{4.50}$ powder, and the $P_{0.4}VS_{5.00}$ powder.

Further, FIG. 15 shows coulombic efficiency in each charge-and-discharge cycle in the cases of using the $VS_4$ powder obtained in Comparative Example 1, the $P_{0.1}VS_{4.25}$ powder obtained in Example 1-1, the $P_{0.2}VS_{4.50}$ powder obtained in Example 2-1, and the $P_{0.4}VS_{5.00}$ powder obtained in Example 4-1. From the results, it can be understood that in the sample of the Comparative Example, the coulombic efficiency significantly decreased from the 15th cycle onward, whereas in all of the samples of the Examples, the decrease in coulombic efficiency was significantly suppressed, improving charge-and-discharge efficiency.

Figure 26:
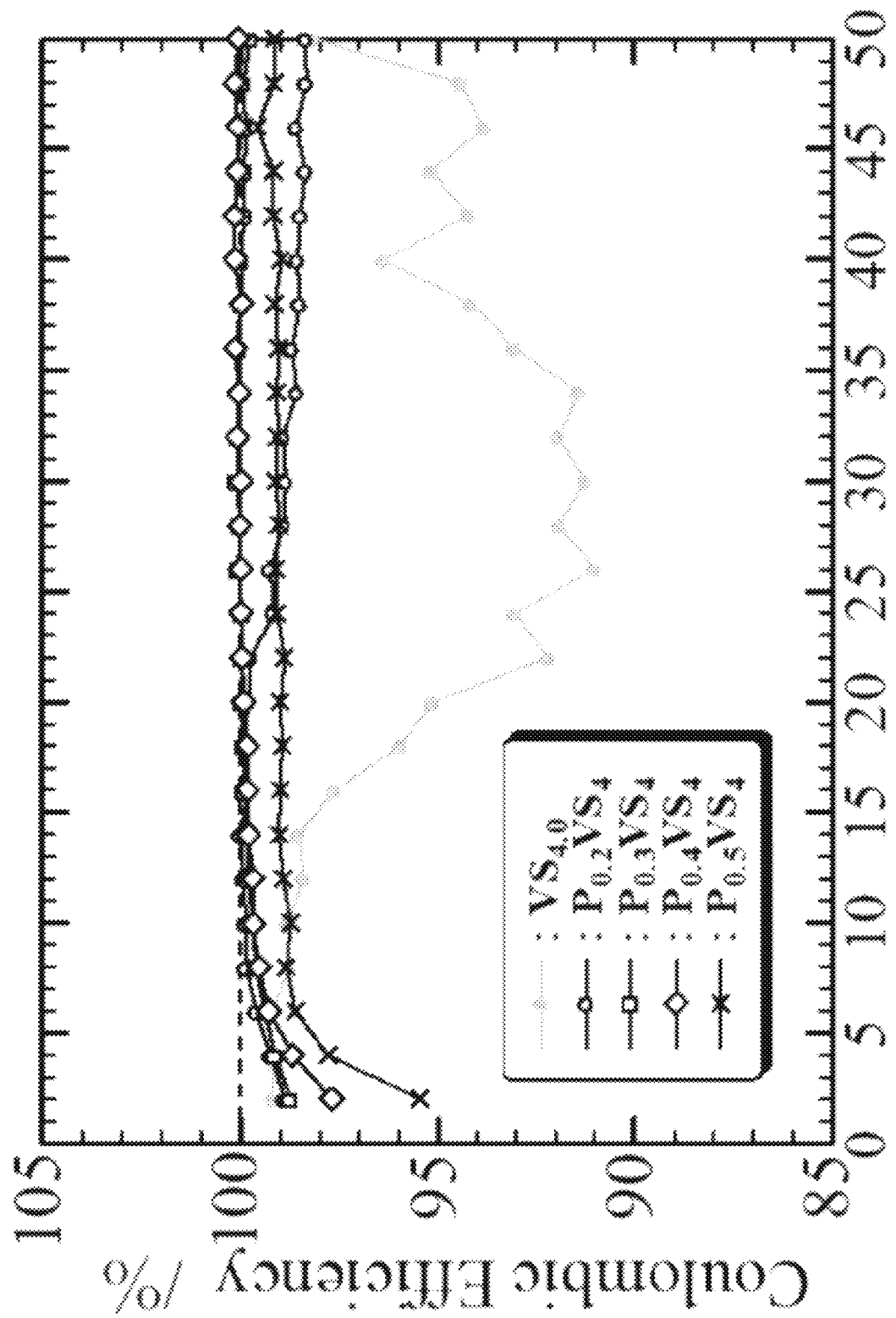
FIG. 26 shows coulombic efficiency in each charge-and-discharge cycle in the cases of using the $VS_4$ powder, the $P_{0.2}VS_4$ powder, the $P_{0.3}VS_4$ powder, the $P_{0.4}VS_4$ powder, and the $P_{0.5}VS_4$ powder.

Further, FIG. 26 shows coulombic efficiency in each charge-and-discharge cycle in the cases of using the $VS_4$ powder obtained in Comparative Example 1, the $P_{0.2}VS_{4.00}$ powder obtained in Example 7-1, the $P_{0.3}VS_{4.00}$ powder obtained in Example 8-1, and the $P_{0.4}VS_{4.00}$ powder obtained in Example 9-1. From the results, it can be understood that in the sample of the Comparative Example, the coulombic efficiency significantly decreased from the 15th cycle onward, whereas in all of the samples of the Examples, the decrease in coulombic efficiency was significantly suppressed, improving charge-and-discharge efficiency.

Figure 27:
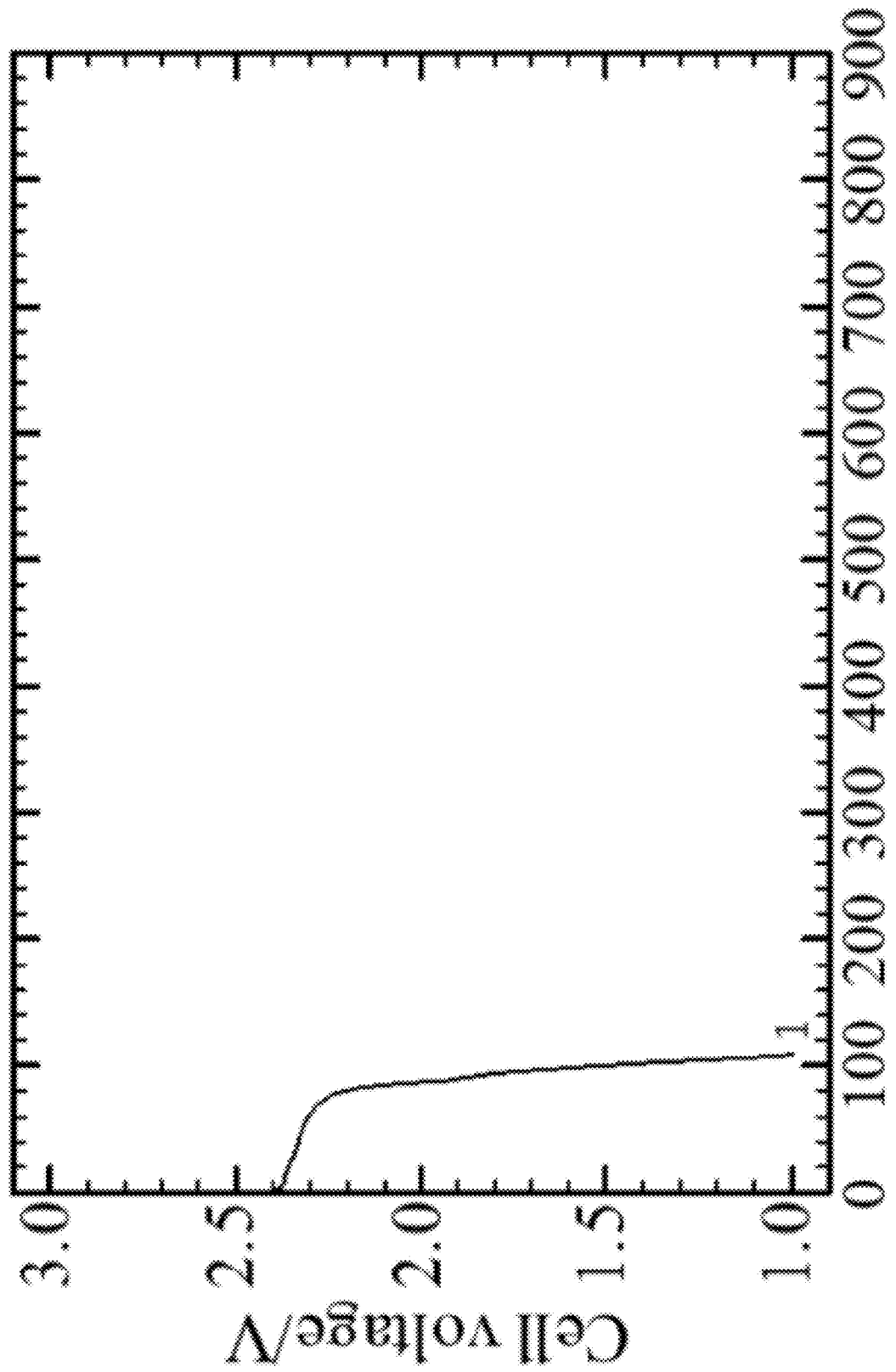
FIG. 27 shows a charge-and-discharge curve (50 cycles) in the case of using an S powder.
Figure 28:
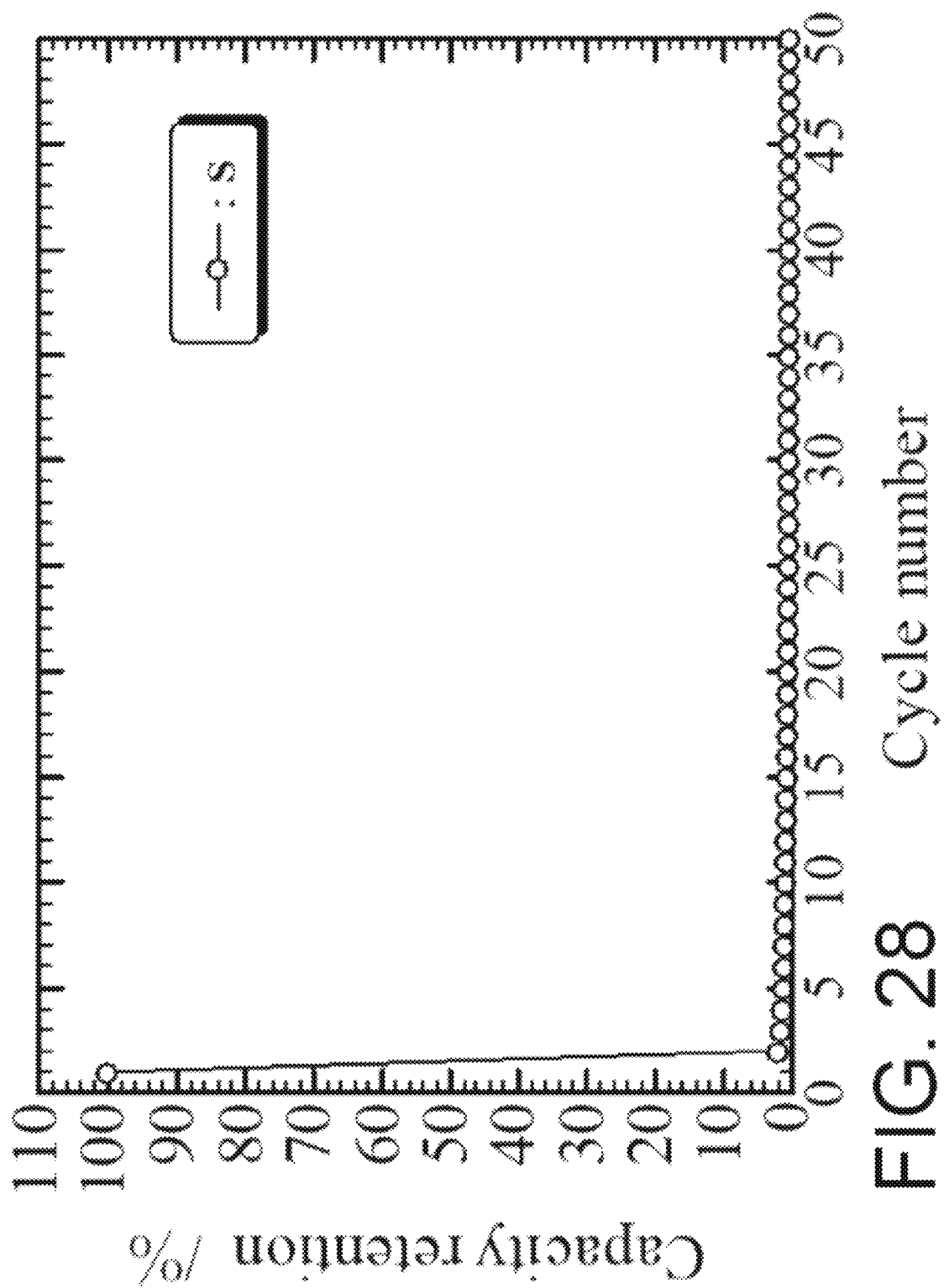
FIG. 28 shows capacity retention over charge-and-discharge cycles up to 50 cycles in the case of using an S powder, based on the discharge capacity of the first cycle taken as 100%.
Figure 29:
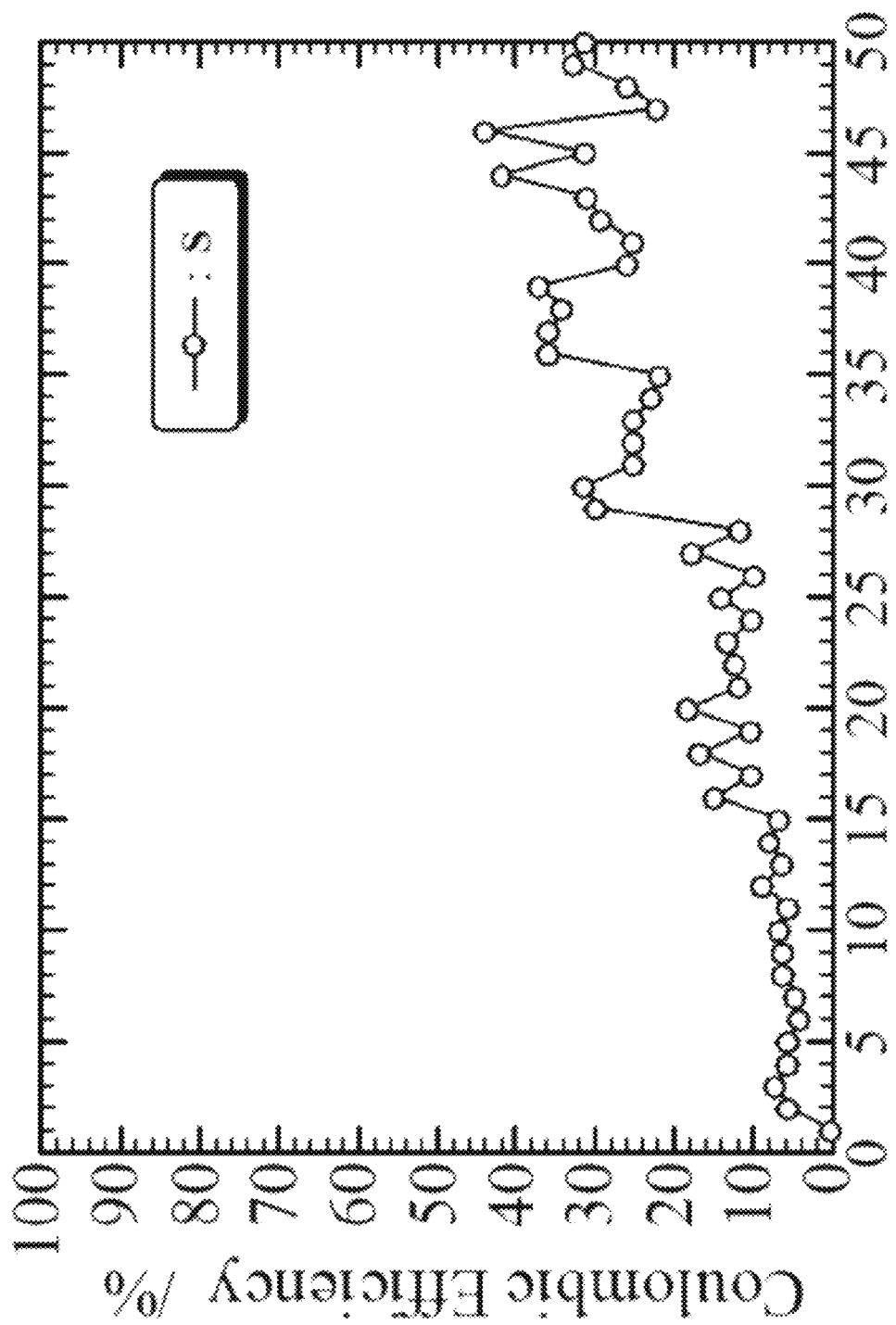
FIG. 29 shows coulombic efficiency in each charge-and-discharge cycle in the case of using an S powder.

Further, FIG. 27 shows a charge-and-discharge curve in the case of using an S powder. FIG. 28 shows capacity retention over charge-and-discharge cycles up to 50 cycles in the case of using an S powder, based on the discharge capacity of the first cycle taken as 100%. FIG. 29 shows coulombic efficiency in each charge-and-discharge cycle in the case of using an S powder. Unlike $VS_4$ electrodes, although a negligible initial discharge capacity was observed (about 100 mAh/g), almost no capacity was obtained in the subsequent cycles, and the coulombic efficiency remained low, indicating that simply increasing the S content in the electrode active material to 100% does not provide the desired properties.

The invention claimed is:
1. A phosphorus-containing low-crystalline vanadium sulfide comprising vanadium, phosphorus, and sulfur as constituent elements, the composition ratio of the phosphorus to the vanadium (P/V) being 0.1 to 1.0 in terms of the molar ratio, the composition ratio of the sulfur to the vanadium S/V) being 4.00 to 10.00 in terms of the molar ratio, wherein said phosphorus-containing low-crystalline vanadium sulfide has a composition represented by formula (1): $P_xVS_y$ (1) wherein x is 0.1 to 1.0, and y is 4.00 to 10.00, and wherein low-crystalline refers to a peak with a maximum at 2θ=15.0° with a tolerance of ±1.0° and half maximum of 1.0° to 3.0°.

2. An electrode active material for lithium-ion secondary batteries, comprising the phosphorus-containing low-crystalline vanadium sulfide according to claim 1.

3. An electrode for lithium-ion secondary batteries, comprising the electrode active material for lithium-ion secondary batteries according to claim 2.

4. A lithium-ion secondary battery comprising the electrode for lithium-ion secondary batteries according to claim 3.

5. A method for producing the phosphorus-containing low-crystalline vanadium sulfide according to claim 1, comprising subjecting a starting material containing a vanadium sulfide and a phosphorus-containing material as a raw material or an intermediate to mechanical milling.

6. The production method according to claim 5, wherein the starting material further contains sulfur.

* * * * *